(12) United States Patent
Pugh et al.

(10) Patent No.: US 10,325,250 B2
(45) Date of Patent: Jun. 18, 2019

(54) SYSTEM AND METHOD FOR LINKING POS PURCHASES TO SHOPPER MEMBERSHIP ACCOUNTS

(71) Applicant: Meijer, Inc., Grand Rapids, MI (US)

(72) Inventors: Brian Pugh, Grand Rapids, MI (US); Elmer L. Robinson, Jr., Mame, MI (US); David Scott Pallas, Hudsonville, MI (US); K. Michael Ross, Grand Rapids, MI (US)

(73) Assignee: Meijer, Inc., Grand Rapids, MI (US)

( * ) Notice: Subject to any disclaimer, the term of this patent is extended or adjusted under 35 U.S.C. 154(b) by 624 days.

(21) Appl. No.: 14/965,823

(22) Filed: Dec. 10, 2015

(65) Prior Publication Data

US 2016/0171468 A1   Jun. 16, 2016

Related U.S. Application Data

(60) Provisional application No. 62/090,150, filed on Dec. 10, 2014.

(51) Int. Cl.
*G06Q 20/20* (2012.01)
*G06Q 20/40* (2012.01)

(52) U.S. Cl.
CPC .......... *G06Q 20/20* (2013.01); *G06Q 20/405* (2013.01)

(58) Field of Classification Search
CPC .............................. G06Q 20/20; G06Q 20/405
USPC ......................................................... 705/16
See application file for complete search history.

(56) References Cited

U.S. PATENT DOCUMENTS

| | | | | |
|---|---|---|---|---|
| 6,070,147 A * | 5/2000 | Harms | ................... | G06Q 30/02 705/14.25 |
| 6,263,319 B1 * | 7/2001 | Leatherman | ........... | B67D 7/067 700/236 |
| 6,912,540 B2 * | 6/2005 | Kohut | .................... | G06Q 30/02 |
| 7,082,409 B1 * | 7/2006 | Cherry | ................... | G06Q 30/02 705/27.1 |
| 7,152,039 B1 * | 12/2006 | Cheng | ................ | G06Q 30/0201 705/7.34 |
| 7,407,089 B2 * | 8/2008 | Patrick | ................... | G06Q 20/20 235/380 |

(Continued)

FOREIGN PATENT DOCUMENTS

WO    WO-2004093022 A1 * 10/2004    ............. G06Q 20/04

*Primary Examiner* — Ashford S Hayles
(74) *Attorney, Agent, or Firm* — Barnes & Thornburg LLP

(57) ABSTRACT

A system and method that links point-of-sale purchases to shopper membership accounts includes a database in which each of one or more electronic payment systems specified by a customer is associated with one of a plurality of enterprise membership service identification codes stored in the database that uniquely identifies the customer as one of a plurality of shopper members of an enterprise membership service program associated with a retail enterprise. In response to tender of an electronic payment system to the point-of-sale system as part of a transaction for the purchase of items, information about the items is stored in one of a plurality of purchase histories that is associated with the one of the plurality of enterprise membership service identification codes that is associated with one of at least two specified electronic payment systems that matches the tendered electronic payment system.

14 Claims, 8 Drawing Sheets

(56) References Cited

U.S. PATENT DOCUMENTS

| | | | | |
|---|---|---|---|---|
| 8,095,439 B1* | 1/2012 | Harman | G06Q 20/0453 | 705/16 |
| 8,175,908 B1* | 5/2012 | Anderson | G06Q 30/0201 | 705/7.29 |
| 8,554,592 B1* | 10/2013 | Merz | G06Q 30/02 | 705/7.11 |
| 8,554,653 B2* | 10/2013 | Falkenborg | G06Q 30/0255 | 705/35 |
| 8,719,193 B1* | 5/2014 | Iannace | G06Q 30/0201 | 706/12 |
| 8,744,898 B1* | 6/2014 | Hewett | G06Q 30/02 | 705/7.29 |
| 9,027,827 B2* | 5/2015 | Dessert | G06Q 20/322 | 235/375 |
| 9,031,867 B1* | 5/2015 | Crawford | G06Q 30/0601 | 705/15 |
| 9,558,503 B2* | 1/2017 | Oh | G06Q 20/202 | |
| 9,626,663 B2* | 4/2017 | Capel | G06Q 20/10 | |
| 9,779,446 B1* | 10/2017 | Hipschman | G06Q 30/0637 | |
| 9,799,071 B1* | 10/2017 | Wilson | G06Q 40/02 | |
| 9,805,366 B1* | 10/2017 | Wilson | G06Q 20/227 | |
| 9,811,813 B2* | 11/2017 | Laracey | G06Q 20/108 | |
| 9,892,439 B2* | 2/2018 | Driscoll | G06Q 30/0609 | |
| 2001/0056405 A1* | 12/2001 | Muyres | G06F 21/10 | 705/52 |
| 2002/0004754 A1* | 1/2002 | Gardenswartz | G06Q 30/02 | 705/26.1 |
| 2002/0174011 A1* | 11/2002 | Sanchez | G06Q 20/387 | 705/14.25 |
| 2002/0188509 A1* | 12/2002 | Ariff | B01J 23/6562 | 705/14.25 |
| 2002/0198772 A1* | 12/2002 | Bates | G06Q 20/201 | 705/14.17 |
| 2003/0009382 A1* | 1/2003 | D'Arbeloff | G06Q 20/02 | 705/17 |
| 2003/0009393 A1* | 1/2003 | Norris | G06Q 20/20 | 705/14.27 |
| 2003/0061132 A1* | 3/2003 | Yu, Sr. | G06Q 30/02 | 705/30 |
| 2003/0065595 A1* | 4/2003 | Anglum | G06Q 30/02 | 705/35 |
| 2003/0078882 A1* | 4/2003 | Sukeda | G06Q 20/06 | 705/39 |
| 2003/0097294 A1* | 5/2003 | Gordon | G06Q 30/0201 | 705/7.29 |
| 2003/0200144 A1* | 10/2003 | Antonucci | G06Q 30/02 | 705/14.28 |
| 2004/0039593 A1* | 2/2004 | Eskandari | G06Q 30/02 | 705/7.31 |
| 2005/0004839 A1* | 1/2005 | Bakker | G06Q 20/10 | 705/14.25 |
| 2005/0144066 A1* | 6/2005 | Cope | G06Q 30/02 | 705/14.25 |
| 2005/0160003 A1* | 7/2005 | Berardi | G06Q 20/00 | 705/14.17 |
| 2005/0273430 A1* | 12/2005 | Pliha | G06Q 20/108 | 705/42 |
| 2006/0065716 A1* | 3/2006 | Peters | G06Q 10/087 | 235/380 |
| 2006/0085270 A1* | 4/2006 | Ruckart | G06Q 20/20 | 705/21 |
| 2006/0111977 A1* | 5/2006 | Hawkins | G06Q 30/02 | 705/14.25 |
| 2006/0143075 A1* | 6/2006 | Carr | G06Q 30/02 | 705/14.35 |
| 2006/0173791 A1* | 8/2006 | Mann, III | G06Q 20/04 | 705/74 |
| 2006/0266826 A1* | 11/2006 | Banfield | G06Q 10/10 | 235/383 |
| 2007/0022008 A1* | 1/2007 | Kingsborough | G06Q 20/10 | 705/14.17 |
| 2007/0083444 A1* | 4/2007 | Matthews | G06Q 10/04 | 705/30 |
| 2007/0156673 A1* | 7/2007 | Maga | G06Q 30/02 | |
| 2007/0185867 A1* | 8/2007 | Maga | G06F 16/24 | |
| 2008/0011837 A1* | 1/2008 | Wesley | G06Q 20/20 | 235/383 |
| 2008/0033816 A1* | 2/2008 | Miller | G06Q 30/02 | 705/14.18 |
| 2008/0059306 A1* | 3/2008 | Fordyce | G06Q 30/02 | 705/14.27 |
| 2008/0086365 A1* | 4/2008 | Zollino | G06Q 30/02 | 705/7.31 |
| 2008/0262925 A1* | 10/2008 | Kim | G06Q 30/02 | 705/14.27 |
| 2009/0204472 A1* | 8/2009 | Einhorn | G06Q 20/20 | 705/14.38 |
| 2009/0240518 A1* | 9/2009 | Borom | G06Q 30/02 | 705/14.1 |
| 2009/0271265 A1* | 10/2009 | Lay | G06Q 20/0453 | 705/14.38 |
| 2009/0272798 A1* | 11/2009 | Dedis | G06Q 30/02 | 235/380 |
| 2009/0281883 A1* | 11/2009 | Benson | G06Q 20/10 | 705/14.3 |
| 2009/0292583 A1* | 11/2009 | Eilam | G06Q 10/06 | 705/7.31 |
| 2009/0299846 A1* | 12/2009 | Brueggemann | G06Q 30/02 | 705/14.29 |
| 2010/0057580 A1* | 3/2010 | Raghunathan | G06Q 20/04 | 705/17 |
| 2010/0076818 A1* | 3/2010 | Peterson | G06Q 30/02 | 705/59 |
| 2010/0088174 A1* | 4/2010 | Cohagan | G06Q 30/02 | 705/14.33 |
| 2010/0094698 A1* | 4/2010 | Cawley | G06Q 30/02 | 705/14.17 |
| 2010/0100434 A1* | 4/2010 | Sock | G06Q 20/0453 | 705/14.38 |
| 2010/0161379 A1* | 6/2010 | Bene | G06Q 30/02 | 705/7.31 |
| 2010/0169336 A1* | 7/2010 | Eckhoff-Hornback | G06Q 10/087 | 707/758 |
| 2010/0205045 A1* | 8/2010 | Zhang | G06Q 30/02 | 705/14.1 |
| 2010/0258620 A1* | 10/2010 | Torreyson | G06Q 20/20 | 235/379 |
| 2010/0301114 A1* | 12/2010 | Lo Faro | G06Q 20/357 | 235/380 |
| 2011/0011931 A1* | 1/2011 | Farley | G06Q 20/20 | 235/382.5 |
| 2011/0035278 A1* | 2/2011 | Fordyce, III | G06Q 20/10 | 705/14.49 |
| 2011/0040609 A1* | 2/2011 | Hawkins | G06Q 30/02 | 705/14.25 |
| 2011/0093324 A1* | 4/2011 | Fordyce, III | G06Q 20/10 | 705/14.27 |
| 2011/0093327 A1* | 4/2011 | Fordyce, III | G06Q 20/10 | 705/14.39 |
| 2011/0131079 A1* | 6/2011 | Valentine | G06Q 30/02 | 705/7.31 |
| 2011/0153339 A1* | 6/2011 | Buck | G06Q 10/10 | 705/1.1 |
| 2011/0208561 A1* | 8/2011 | Randall | G06Q 30/02 | 705/7.32 |
| 2011/0231223 A1* | 9/2011 | Winters | G06Q 20/10 | 705/7.29 |
| 2011/0231305 A1* | 9/2011 | Winters | G06Q 20/10 | 705/39 |
| 2011/0251882 A1* | 10/2011 | Richard | G06Q 30/02 | 705/14.25 |
| 2011/0264502 A1* | 10/2011 | Taylor | G06Q 20/20 | 705/14.25 |
| 2011/0288922 A1* | 11/2011 | Thomas | G06Q 30/02 | 705/14.23 |

(56) References Cited

U.S. PATENT DOCUMENTS

| | | | | |
|---|---|---|---|---|
| 2012/0004972 A1* | 1/2012 | Wengrovitz | G06Q 20/204 | 705/14.27 |
| 2012/0022944 A1* | 1/2012 | Volpi | G06Q 30/00 | 705/14.53 |
| 2012/0066051 A1* | 3/2012 | Black | G06Q 30/0233 | 705/14.33 |
| 2012/0066062 A1* | 3/2012 | Yoder | G06Q 30/02 | 705/14.51 |
| 2012/0078716 A1* | 3/2012 | Ross | G06O 30/0255 | 705/14.53 |
| 2012/0084135 A1* | 4/2012 | Nissan | G06Q 30/0238 | 705/14.38 |
| 2012/0123841 A1* | 5/2012 | Taveau | G06Q 20/10 | 705/14.23 |
| 2012/0166270 A1* | 6/2012 | Coppinger | G06Q 30/0236 | 705/14.36 |
| 2012/0197691 A1* | 8/2012 | Grigg | G06Q 20/20 | 705/14.1 |
| 2012/0215584 A1* | 8/2012 | Narsude | G06Q 20/202 | 705/7.29 |
| 2012/0253914 A1* | 10/2012 | Black | G06Q 30/02 | 705/14.28 |
| 2012/0316945 A1* | 12/2012 | Wolf | G06Q 20/28 | 705/14.17 |
| 2012/0317008 A1* | 12/2012 | Subramanian | G06Q 30/02 | 705/35 |
| 2012/0317027 A1* | 12/2012 | Luk | G06Q 40/02 | 705/44 |
| 2013/0032635 A1* | 2/2013 | Grinvald | G06Q 20/027 | 235/384 |
| 2013/0036119 A1* | 2/2013 | Yakout | G06F 16/24558 | 707/737 |
| 2013/0054396 A1* | 2/2013 | Goldfinger | G06Q 30/0238 | 705/21 |
| 2013/0073405 A1* | 3/2013 | Ariyibi | G06Q 30/02 | 705/17 |
| 2013/0117170 A1* | 5/2013 | Coppinger | G06Q 30/0207 | 705/35 |
| 2013/0124258 A1* | 5/2013 | Jamal | G06Q 30/02 | 705/7.29 |
| 2013/0159154 A1* | 6/2013 | Purves | G06Q 20/36 | 705/35 |
| 2013/0238408 A1* | 9/2013 | Cooke | G06Q 30/0207 | 705/14.3 |
| 2013/0246125 A1* | 9/2013 | DiGioacchino | G06Q 30/0201 | 705/7.33 |
| 2013/0246146 A1* | 9/2013 | Fischer | G06Q 30/0222 | 705/14.23 |
| 2013/0246261 A1* | 9/2013 | Purves | G06Q 20/105 | 705/41 |
| 2013/0282464 A1* | 10/2013 | Bradley | G06Q 20/227 | 705/14.27 |
| 2013/0282468 A1* | 10/2013 | Michael | G06Q 30/0227 | 705/14.28 |
| 2013/0339238 A1* | 12/2013 | Unland | G06Q 30/0617 | 705/44 |
| 2014/0012739 A1* | 1/2014 | Wall | G06Q 20/383 | 705/39 |
| 2014/0074569 A1* | 3/2014 | Francis | G06Q 20/40 | 705/14.3 |
| 2014/0074581 A1* | 3/2014 | Johnson | G06Q 30/02 | 705/14.33 |
| 2014/0074675 A1* | 3/2014 | Calman | G06Q 40/12 | 705/35 |
| 2014/0081839 A1* | 3/2014 | Blackhurst | G06Q 20/10 | 705/39 |
| 2014/0081856 A1* | 3/2014 | Blackhurst | G06Q 20/387 | 705/41 |
| 2014/0180826 A1* | 6/2014 | Boal | G06Q 30/0245 | 705/14.66 |
| 2014/0214566 A1* | 7/2014 | High | G06Q 20/0453 | 705/17 |
| 2014/0222545 A1* | 8/2014 | Hajji | G06Q 20/20 | 705/14.38 |
| 2014/0244462 A1* | 8/2014 | Maenpaa | G06Q 20/0453 | 705/35 |
| 2014/0279471 A1* | 9/2014 | England | G06O 20/3572 | 705/41 |
| 2014/0289007 A1* | 9/2014 | Bhattacharya | G06Q 30/0202 | 705/7.31 |
| 2014/0297556 A1* | 10/2014 | Ryan | G06Q 30/0226 | 705/346 |
| 2014/0379453 A1* | 12/2014 | Booth | G06Q 30/0226 | 705/14.27 |
| 2015/0051947 A1* | 2/2015 | Merz | A01D 34/81 | 705/7.29 |
| 2015/0051957 A1* | 2/2015 | Griebeler | G06Q 10/06395 | 705/7.41 |
| 2015/0120421 A1* | 4/2015 | Deshpande | G06Q 30/0224 | 705/14.25 |
| 2015/0120478 A1* | 4/2015 | Jang | G06O 20/3221 | 705/24 |
| 2015/0142604 A1* | 5/2015 | Kneen | G06Q 30/0613 | 705/26.41 |
| 2015/0161642 A1* | 6/2015 | Pastore | G06Q 30/0224 | 705/14.25 |
| 2015/0178731 A1* | 6/2015 | Irizari | G06Q 20/202 | 705/21 |
| 2015/0187021 A1* | 7/2015 | Moring | G06Q 40/12 | 705/17 |
| 2015/0248726 A1* | 9/2015 | Pontious | G06Q 20/24 | 235/380 |
| 2015/0269561 A1* | 9/2015 | Barrett | G06Q 20/28 | 705/17 |
| 2016/0019629 A1* | 1/2016 | Briancon | G06Q 30/0201 | 705/26.8 |
| 2016/0148182 A1* | 5/2016 | Craine | G06Q 20/20 | 705/16 |
| 2016/0171472 A1* | 6/2016 | Pugh | G06O 20/204 | 705/14.23 |
| 2016/0379241 A1* | 12/2016 | Badger | G06Q 30/0226 | 705/14.27 |
| 2017/0083930 A1* | 3/2017 | Nagaraj | G06Q 30/0207 | |
| 2017/0262827 A1* | 9/2017 | Lee | G06Q 20/204 | |

* cited by examiner

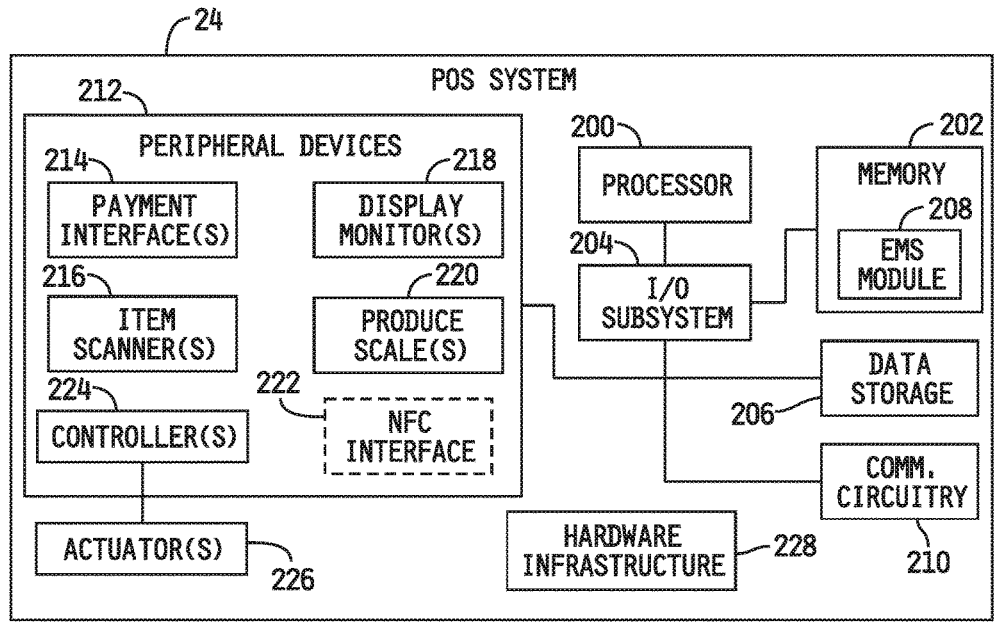
FIG. 2
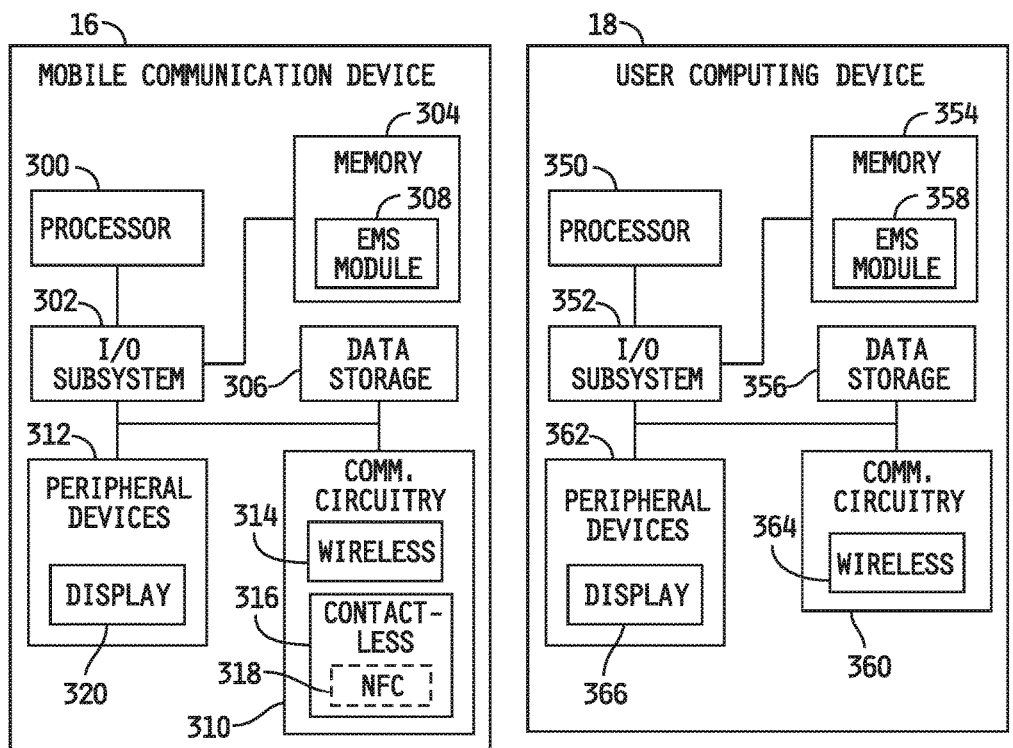
FIG. 3A
FIG. 3B

SYSTEM AND METHOD FOR LINKING POS PURCHASES TO SHOPPER MEMBERSHIP ACCOUNTS

CROSS-REFERENCE TO RELATED APPLICATIONS

This patent application claims the benefit of, and priority to, U.S. Provisional Patent Application Ser. No. 62/090,150, filed Dec. 10, 2014, the disclosure of which is expressly incorporated herein by reference.

FIELD OF THE INVENTION

The present invention relates generally to systems and methods for tracking purchases made by shoppers at a retail enterprise, and more specifically to systems and methods for automatically linking such purchases to shopper membership accounts managed by the retail enterprise.

BACKGROUND

Retailers of goods and services typically offer such goods and services for purchase via one or more conventional brick-and-mortar retail stores and/or via one or more Internet-accessible websites, i.e., one or more websites accessible via a global system of interconnected computer networks. It may be desirable for retailers to track via a shopper membership service purchases made by their customers over time and to associate customers within the shopper membership service with their corresponding purchase histories. It may further be desirable to include in such purchase histories subsequent purchases made by customers in a manner that does not require customers to identify to the retailer at the point-of-sale any information that links the customers within the shopper membership service to their corresponding purchase histories.

SUMMARY

The present invention may comprise one or more of the features recited in the attached claims, and/or one or more of the following features and combinations thereof. In one aspect, a method for linking POS purchases to shopper membership accounts may comprise associating, with a processor in a database, each of one or more electronic payment systems specified by a customer with one of a plurality of enterprise membership service identification codes stored in the database that uniquely identifies the customer as one of a plurality of shopper members of an enterprise membership service program associated with a retail enterprise, and in response to tender of an electronic payment system to a point-of-sale interface of the retail enterprise as part of a transaction for the purchase from the retail enterprise of one or more items, storing, with the processor, information about the one or more items in the transaction in one of a plurality of purchase histories contained in the database that is uniquely identified by the one of the plurality of enterprise membership service identification codes associated with the one or more specified electronic payment systems if the tendered electronic payment system matches one of the one or more specified electronic payment systems in the database. The plurality of purchase histories may each be associated with a different one of the plurality of enterprise membership identification codes and each containing information about items previously purchased from the retail enterprise by a corresponding customer.

In another aspect, a system for linking POS purchases to shopper membership accounts may comprise at least one database having stored therein (a) a plurality of enterprise membership service identification codes each uniquely identifying a different customer as a shopper member of an enterprise membership service program associated with a retail enterprise, (b) two or more electronic payment systems each associated with a different one of the plurality of enterprise membership service identification codes, and (c) a plurality of purchase histories each associated with a different one of the plurality of enterprise membership identification codes and each containing information about items previously purchased from the retail enterprise by a corresponding customer, a processor, a point-of-sale system controlled, at least in part, by the processor, and memory having instructions stored therein which, when executed by the processor, cause the processor to store in the at least one database, in response to tender of an electronic payment system to the point-of-sale system as part of a transaction for the purchase from the retail enterprise of one or more items, information about the one or more items in the transaction in the one of the plurality of purchase histories associated with the one of the plurality of enterprise membership service identification codes that is associated with the one of the at least two specified electronic payment systems in the database that matches the tendered electronic payment system.

In yet another aspect, a system for linking POS purchases to shopper membership accounts may comprise at least one database having stored therein (a) a plurality of enterprise membership service identification codes each uniquely identifying a different customer as a shopper member of an enterprise membership service program associated with a retail enterprise, (b) two or more electronic payment systems each associated with a different one of the plurality of enterprise membership service identification codes, and (c) a plurality of purchase histories each associated with a different one of the plurality of enterprise membership identification codes and each containing information about items previously purchased from the retail enterprise by a corresponding customer, a point-of-sale system, and a server coupled to the point-of-sale system. The server may include at least one module to identify the one of the plurality of enterprise membership service identification codes associated with one of the two or more electronic payment systems that matches an electronic payment system tendered to the point-of-sale system as part of a transaction for the purchase from the retail enterprise of one or more items, and to store information about the one or more items in the transaction in the one of the plurality of purchase histories associated with the identified one of the plurality of enterprise membership service identification codes.

In still another aspect, a non-transitory machine-readable medium may comprise a plurality of instructions which, when executed by at least one processor, result in the at least one processor associating, in a database, each of one or more electronic payment systems specified by a customer with one of a plurality of enterprise membership service identification codes stored in the database that uniquely identifies the customer as one of a plurality of shopper members of an enterprise membership service program associated with a retail enterprise, and in response to tender of an electronic payment system to a point-of-sale interface of the retail enterprise as part of a transaction for the purchase from the retail enterprise of one or more items, storing information about the one or more items in the transaction in one of a plurality of purchase histories contained in the database that is uniquely identified by the one of the plurality of enterprise membership service identification codes associated with the one or more specified electronic payment systems if the tendered electronic payment system matches one of the one or more specified electronic payment systems in the database. The plurality of purchase histories may each be associated with a different one of the plurality of enterprise membership identification codes and each containing information about items previously purchased from the retail enterprise by a corresponding customer.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

FIG. 2 is a simplified block diagram of an embodiment of one of the point-of-sale systems illustrated in FIG. 1.

FIG. 3A is a simplified block diagram of an embodiment of one of the mobile communication devices illustrated in FIG. 1.

FIG. 3B is a simplified block diagram of an embodiment of one of the user computing devices illustrated in FIG. 1.

DETAILED DESCRIPTION OF THE DRAWINGS

Figure 1:
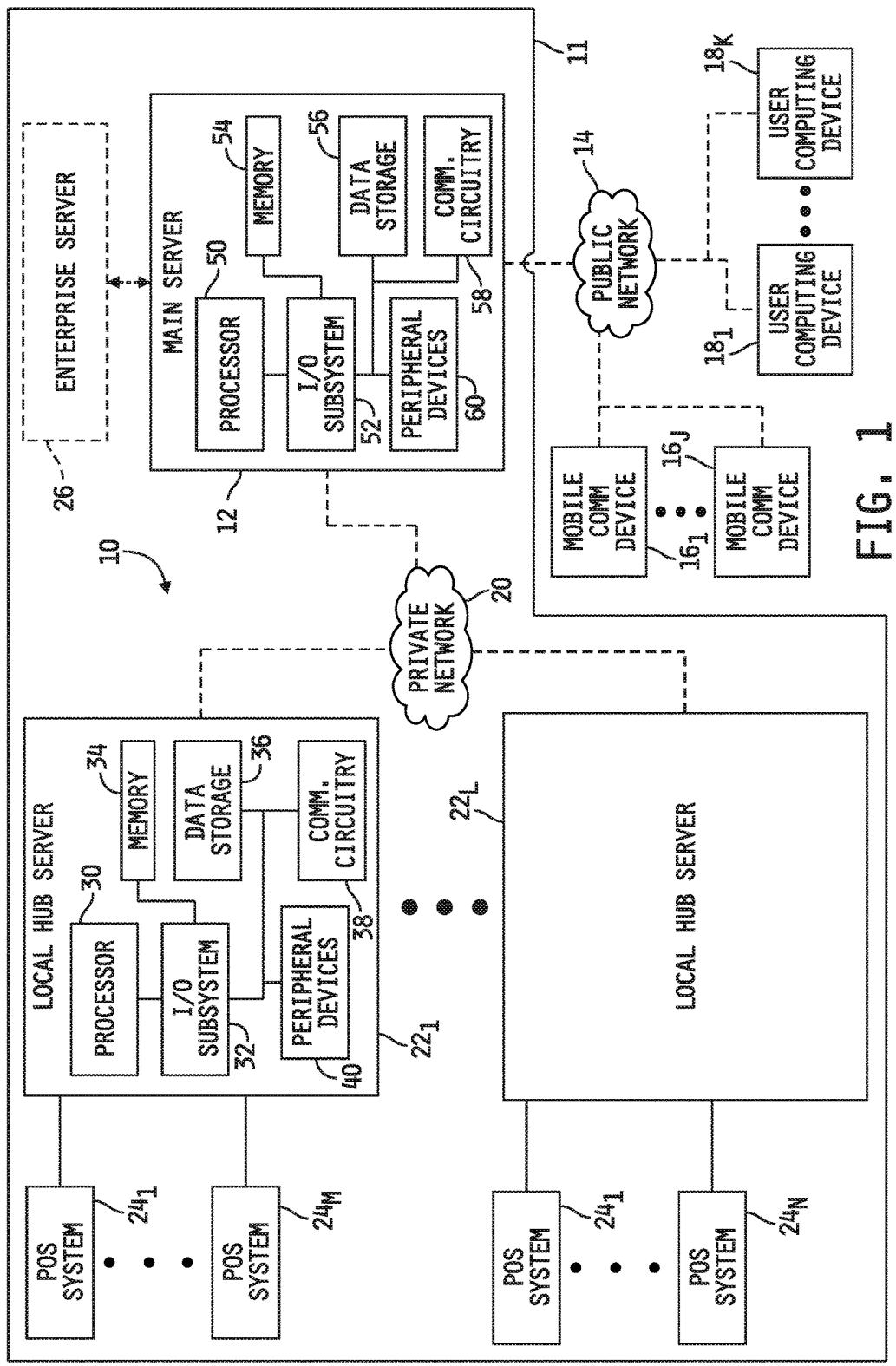
FIG. 1 is a simplified block diagram of an embodiment of a system for linking POS purchases to shopper membership accounts.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic, and/or any subset of features, structures, process, process steps or characteristics, disclosed herein may be combined with any one or more other disclosed feature, structure, process, process step or characteristic, whether or not explicitly described, and it will be understood that no limitations on the types and/or number of such combinations are therefore intended or should be inferred.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more machine-readable media, which may be read and executed by one or more processors. A machine-readable medium should be understood to mean a non-transitory machine-readable medium, i.e., one that does not include transitory signals, and such a machine-readable medium may illustratively be embodied as any device or physical structure for storing or transmitting information in a form readable by a machine (e.g., a computing device). For example, and without limitation, a machine-readable medium may be embodied as any one or combination of read only memory (ROM); random access memory (RAM); magnetic disk storage media; optical storage media; flash memory devices; and others.

System Components

Referring now to FIG. 1, a system 10 is shown for linking POS purchases, i.e., purchases made at point-of-sale systems, to customer membership accounts. The system 10 includes a retail enterprise 11 having a main server 12 configured to communicate with customers of the retail enterprise via a public network 14, e.g., the Internet, and customers may access the public network 14 using any conventional public network accessible electronic device and/or system. In the illustrated embodiment, for example a number, J, of mobile communication devices $16_1$-$16_J$ are shown, where J may be any positive integer. The retail enterprise 11 may include any number of brick-and-mortar retail stores or locations each having one or more point-of-sale systems $24_1$-$24_M$ operating therein. As used herein, the phrases "brick-and-mortar enterprise location" and brick-and-mortar store" will be understood to be synonymous. In any case, the main server 12 is configured to communicate with each such point-of-sale (POS) system $24_1$-$24_M$, each of which operates in a conventional manner to process items to be purchased by customers during purchase transactions. In some embodiments, as will be described in greater detail below, the main server 12 may be coupled, e.g., via a private network 20, to one or more local hub servers 22₁-22_L each associated with one of the brick and mortar stores, wherein each such hub server 22₁-22_L is communicatively coupled to any number of POS system(s) 24₁-24_N. In some alternate embodiments, some or all of the local hub servers 22₁-22_L may be omitted and for each such omitted local hub server 22₁-22_L, the main server 12 may be coupled directly to the corresponding POS system(s) 24₁-24_M, 24₁-24_N.

In the embodiment illustrated in FIG. 1, the main server 12 is illustratively coupled via a private network 20 to a plurality of local hub servers 22, and each local hub server 22 is associated with a different one of the one or more brick-and-mortar stores. Some retail enterprises 11 may include a single brick and mortar outlet, and other larger retail enterprises 11 may include two or more physically remote brick and mortar outlets. In the latter case, the retail enterprise 11 may include, for example, a main physical location with two or more remote physical locations, and for purposes of this document the two or remote physical locations in such an arrangement are referred to as "hub" locations. In this disclosure, the system 10 will be illustrated and described in the context of such a larger retail enterprise having a main physical location and two or more physical hub locations. In this regard, the main server 12 in the system 10 shown in FIG. 1 will typically be located at a main business location of the retail enterprise, and will be coupled via the network 20 to two or more local hub servers 22, each of which will typically be located at a different one of the two or more hub locations. In embodiments which do not include any local hub servers 22₁-22_L, the main server 12 will be coupled via the network 20 to the one or more POS systems 24₁-24_M, 24₁-24_N. In any case, communicative coupling between the local hub server 22 or the main server 12 and the one or more point-of-sale systems 24₁-24_M, 24₁-24_N may be accomplished using any known hardwire and/or wireless communication coupling, and communications over any such hardwire and/or wireless coupling may be accomplished using any known communication protocol.

In some alternative embodiments, as described above, one or more (or all) of the local hub servers 22₁-22_L may be omitted. In other alternative embodiments, the main server 12 may be omitted and at least one of the local hub servers 22 may be configured to act as a so-called master server with the remaining local hub servers 22 configured to act as so-called slave servers. In still other alternative embodiments in which the retail enterprise 11 includes only a single brick and mortar outlet, the local hub servers 22 may be or include the main server 12 or vice versa. For purposes of the following description, any process disclosed as being controlled by the main server 12 may, in some embodiments, instead be controlled, in whole or in part, by one or more local hub servers 22 and vice versa, and/or may be controlled, in whole or in part, by one of the point-of-sale systems 24₁-24_M, 24₁-24_N and vice versa.

In embodiments which include one or more local hub servers 22₁-22_L, each such local hub server 22 may be embodied as any type of server (e.g., a web server) or similar computing device capable of performing the functions described herein. In the illustrative embodiment of FIG. 1, the local hub server 22 includes a processor 30, an I/O subsystem 32, a memory 34, a data storage 36, a communication circuitry 38, and one or more peripheral devices 40. It should be appreciated that the local hub server 22 may include other components, sub-components, and devices commonly found in a server and/or computing device, which are not illustrated in FIG. 1 for clarity of the description.

The processor 30 of the local hub server 22 may be embodied as any type of processor capable of executing software/firmware, such as a microprocessor, digital signal processor, microcontroller, or the like. The processor 30 may be a single processor or include multiple processors. The I/O subsystem 32 of the local hub server 22 may be embodied as circuitry and/or components to facilitate input/output operations with the processor 30 and/or other components of the local hub server 22. The processor 30 is communicatively coupled to the I/O subsystem 32.

The memory 34 of the user local hub server 22 may be embodied as or otherwise include one or more conventional volatile and/or non-volatile memory devices. The memory 34 is communicatively coupled to the I/O subsystem 32 via a number of signal paths. Although only a single memory device 34 is illustrated in FIG. 1, the local hub server 22 may be or include any number of memory devices. Various data and software may be stored in the memory 34. The data storage 36 is also communicatively coupled to the I/O subsystem 32 via a number of signal paths, and may be embodied as any type of device or devices configured for the short-term or long-term storage of data such as, for example, memory devices and circuits, memory cards, hard disk drives, solid-state drives, or other data storage devices.

The communication circuitry 38 of the local hub server 22 may include any number of devices and circuitry for enabling communications between the local hub sever 22 and the main server 12 and/or between the local hub server 22 and the one or more point-of-sale systems 24₁-24_M, 24₁-24_N. In the illustrated embodiment, for example, communication between the local hub server 22 and the main server 12 takes place wirelessly via the network 20, wherein the network 20 may represent, for example, a private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the local hub server 22 and the main server 12 may be a non-private network and/or may be, in whole or in part, a wired connection. Generally, the communication circuitry 38 may be configured to use any one or more, or combination, of conventional secure and/or unsecure communication protocols to communicate with the main server 12. As such, the network 20 may include any number of additional devices, such as additional computers, routers, and switches, to facilitate communications between the local hub server 22 and the main server 12. Communication between the local hub server 22 and the one or more point-of-sale systems 24₁-24_M, 24₁-24_N may take place via one or more such wireless communication interfaces and/or via one or more conventional wired interfaces.

In some embodiments, the local hub server 22 may also include one or more peripheral devices 40. Such peripheral devices 40 may include, for example, but are not limited to, any number of additional input/output devices, interface devices, and/or other peripheral devices. For example, the peripheral devices 40 may include a display, a keyboard, a mouse, audio processing circuitry, and/or other input/output devices.

Others of the local hub servers 22₁-22_L, e.g., serving other brick-and-mortar locations, may be substantially similar to the local hub server 22 and include similar components. As such, the description provided above of the components of the local hub server 22 may be equally applicable to such similar components of other local hub servers and are not repeated herein so as not to obscure the present disclosure. Of course, it should be appreciated that in some embodiments one or more of the local hub servers 22 and may be dissimilar to others of the local hub servers 22.

An embodiment of the main server 12 is also illustrated in FIG. 1, and generally includes the same components as the local hub server 22. For example, a processor 50 is coupled to an I/O subsystem 52, and the I/O subsystem 52 is coupled to a memory 54, a data storage unit 56, communication circuitry 58 and one or more peripheral devices 60. In some embodiments, each of the foregoing components may be identical to corresponding components of the local hub server 22 described above, and a detailed explanation of such components therefore will not be repeated here. In other embodiments, the main server 12 may be configured differently than the local hub server 22 described above. In any case, the communication circuitry 38 of each of the local hub servers 22 facilitates communication with the communication circuitry 58 of the main server 12 and vice versa so that information can be shared between the main server 12 and each of the one or more local hub servers 22 via the network 20. Although only one such main server 12 is shown in FIG. 1, it should be appreciated that, in other embodiments, the system 10 may include any number of main servers, and in still other embodiments the main server 12 may be communicatively coupled to one or more remote servers of the retail enterprise, e.g., at least one remote enterprise server 26 as shown by dashed-line representation in FIG. 1. Any such one or more remote servers 26 may include any structure or feature illustrated and described herein with respect to the main server 12, and may be configured to execute any one or more functions described with respect to the main server 12 either alternatively to the main server 12 or in addition to the main server 12. In any case, the main server 12 may be embodied as any type of server (e.g., a web server) or similar computing device capable of performing the functions described herein.

In embodiments in which the one or more point-of-sale systems $24_1$-$24_M$, $24_1$-$24_N$ are controlled by the main server 12, and also in embodiments in which such components are controlled by one or more of the local hub servers $22_1$-$22_L$, it will be understood that any such server may be or include a single server, multiple servers, one or more cloud servers, i.e., one or more dedicated hosting and/or shared hosting, off-site servers providing server resources to the retail enterprise according to a rental or lease arrangement, one or more shared-processor servers, two or more point-to-point servers, or the like.

The mobile communication devices $16_1$-$16_J$ and the user computing devices $18_1$-$18_K$ illustrated in FIG. 1 are intended to depict mobile communication devices and personal or general purpose computers respectively that are each separately owned and/or operated by a different customer. No limit on the total number of such mobile communication devices $16_1$-$16_J$ and/or user computing devices $18_1$-$18K$ that may be owned and operated by any one customer, or on the total number of such mobile communication devices $16_1$-$16_J$ and/or user computing devices $18_1$-$18_K$ that may communicate with the main server 12, is intended or should be inferred. The mobile communication devices $16_1$-$16_J$ may be or include any mobile electronic device capable of executing one or more software application programs as described herein and of communicating with the main server 12 via the public network 14. Examples of the mobile communication devices $16_1$-$16_J$ include, but should not be limited to, mobile telephones, smart phones, tablet computers, personal data assistants (PDAs), wearable electronic communication devices, including eye glasses, watches, devices attached to and/or integral with clothing, headwear and/or footwear, implanted electronic communication devices, and the like. Other examples include any one or more such mobile communication devices mounted to or integral with a mobile structure and configured to communicate with, or to at least wirelessly exchange some amount of information with, any of the foregoing example customer (and/or employee) mobile communication devices, and examples of such mobile structures include, but are not limited to, a wheeled cart, such as a conventional shopping cart or other wheeled cart, basket, platform or carriage, a manually-carried shopping basket, a wheeled or non-wheeled walking aid, a wheelchair, an electrically powered or motorized vehicle such as a mobility scooter, and the like.

The user computing devices $18_1$-$18_K$ illustrated in FIG. 1 are intended to include any of privately owned and accessed computers, such as those residing in customer's residences, to include semi-privately owned and accessed computers, such as those residing at multiple-employee business enterprises, and publicly accessible computers, such as those available at internet cafés and kiosks. The user computing devices $18_1$-$18_K$ may be or include any computer capable of executing one or more software programs and of communicating with the main server 12 via the public network 14. Examples of the user computing devices $18_1$-$18_K$ include, but should not be limited to, personal computers (PCs), laptop computers, notebook computers and the like, whether or not networked with one or more other computing devices.

Point-of-Sale System Components

Referring now to FIG. 2, an embodiment 24 of one of the one or more point-of-sale systems, $24_1$-$24_M$, $24_1$-$24_N$, is shown which includes components similar to the main server 12 and also to the one or more local hub servers $22_1$-$22_L$, such as a processor 200, an I/O subsystem 204, a memory 202, a data storage device 206, communication circuitry 210 and a number of peripheral devices 212. In some embodiments, each of the foregoing components may be identical to corresponding components of the local hub server $22_1$ described above, and a detailed explanation of such components will not be repeated here for brevity. In other embodiments, any of the one or more point-of-sale systems $24_1$-$24_M$, $24_1$-$24_N$ may be configured differently than the local hub server $22_1$ described above. In the illustrated embodiment, the memory 202 illustratively includes an EMS module 208 in the form of, e.g., instructions executable by the processor 200, to communicate customer-member information relating to customers' enterprise membership system (EMS) accounts (e.g., described below with respect to FIG. 4) to and from the main server 12, and to control one or more local peripheral devices to facilitate communications between customer-members and the main server 12 and to facilitate manual customer input of customer-identifying information as will be described in detail below.

Additionally, the illustrated point-of-sale system 24 includes one or more actuators 226 and hardware infrastructure 228, examples of which will be described below. It will be appreciated that the point-of-sale system 24 may include other components, sub-components, and devices commonly found in a computer and/or computing device. In any case, the communication circuitry 210 is configured to facilitate communication with a corresponding one of the local hub servers $22_1$-$22_L$ and the point-of-sale system 24 may use any suitable communication protocol to communicate with the corresponding local hub server $22_1$-$22_L$.

In addition to, or alternatively to, the number of peripheral devices 40 of the local hub server $22_1$ described above, the number of peripheral devices 212 of the point-of-sale system 24 may include any number of other peripheral or interface devices. Examples of some of the peripheral devices 212 illustrated in FIG. 2 include, but should not be limited to, one or more conventional payment interfaces 214, one or more conventional item price scanners 216, one or more conventional display monitors 218, one or more conventional produce scales 220 and one or more conventional controllers 224 for controlling one or more conventional actuators 226 associated with the operation of the point-of-sale system 24. The one or more payment interfaces 214 are provided, e.g., to facilitate physical receipt of credit/debit card and/or other form of payment from customers (shoppers), and each such interface 214 may illustratively include one or more of a display, a touch screen, a keyboard, a mouse, external speakers, and/or other peripheral devices. One or more of the payment interfaces 214 may further include a produce scale 220, and one or more produce scales 220 may alternatively be coupled to the point-of-sale system 24 separately from the one or more customer payment interfaces 214. The one or more item scanner(s) 216 is/are configured to scan price code labels or other such indicators for items being purchased by customers and to also scan print media coupons.

The one or more display monitor(s) 218 provide item and/or pricing information to customers and/or enterprise employees, and may further provide additional information regarding cost and/or discounts for one or more items being purchased as well as information regarding discounts realized by customers through the use of print media and/or virtual coupons. The display monitor(s) 218 may additionally provide an interface, e.g., touchscreen or a co-located keypad, via which customers may input information such as their EMSID into the system 10. The peripheral devices 212 of the point-of-sale system 24 may further optionally include a near-field communication (NFC) interface 222, as illustrated in dashed-line configuration in FIG. 2, which may be included in embodiments in which one or more of the mobile communication devices $16_1$-$16_J$ also has such a near-field communication (NFC) device such that information, e.g., customer identification information and/or customer payment information can be transferred from such one or more of the mobile communication devices $16_1$-$16_J$ to the point-of-sale system 24 by tapping the two near-field communication devices together or by passing the near-field communication device of a so-equipped mobile communication device $16_1$-$16_J$ sufficiently close to the near-field communication device 222 to effectuate such communication. Illustratively, customers may additionally transfer customer identification information to the point-of-sale system 24 via the payment interface 214, item scanner 216 or other peripheral device(s).

The point-of-sale system 24 further includes hardware infrastructure 228 which forms the structural backbone of the point-of-sale system 24. Examples of structural components that may be included in the hardware infrastructure 228 include, but should not be limited to, one or more purchased item transport units, e.g., one or more purchased item conveyance units or systems, one or more conventional purchased item bagging areas, e.g., one or more conventional item bagging carousals, one or more purchased item support units, and the like. The one or more actuators 226 may be or include any actuator that is controllable by at least one of the one or more conventional controllers 224, and which may facilitate operation and/or control of the hardware infrastructure of the point-of-sale system 24. Examples of such one or more actuators may include, but should not be limited to, one or more linear and/or rotational drive motors, one or more electronically controlled switches, and the like.

Mobile Communication Device Components

Referring now to FIG. 3A, an embodiment of one of the mobile communication devices 16 illustrated in FIG. 1 is shown, which includes components similar to the main server 12 and also to the one or more local hub servers $22_1$-$22_L$ and the one or more POS systems $24_1$-$24_M$, $24_1$-$24_N$, such as a processor 300, an I/O subsystem 302, a memory 304 including an EMS module 308, a data storage device 306, communication circuitry 312 and a number of peripheral devices 314. In some embodiments, each of the foregoing components may be identical to corresponding components of the local hub server $22_1$ and/or POS system 24 described above, and a detailed explanation of such components will not be repeated here for brevity. In other embodiments, any of the one or more mobile communication devices $16_1$-$16_J$ may be configured differently than the local hub server $22_1$ described above. It will be appreciated that the mobile communication device 16 may include other components, sub-components, and devices commonly found in a computer and/or computing device.

The memory 304 illustratively includes an EMS module 308 in the form of, e.g., instructions executable by the processor 300 to communicate customer-member information to and from the main server 12, and to control one or more local peripheral devices to facilitate communications between customer-members of an enterprise membership service (EMS) program (EMS program is described below) and the main server 12 and to facilitate customer input of customer-identifying information, e.g., an EMS identifying number and/or code (EMSID).

The communication circuitry 312 illustratively includes conventional wireless communication circuitry 316 configured to facilitate communication with the main server 12 via the network 14, and the mobile communication device 16 may use any suitable communication protocol to communicate with the corresponding main server 12. The communication circuitry 312 of the mobile communication device 16 may further optionally include conventional contact-less communication circuitry 318, which may include a conventional near-field communication (NFC) device 320, as illustrated by dashed-line representation in FIG. 3A. The near-field communication device 320 may be included, for example, in embodiments in which one or more of the point-of-sale systems $24_1$-$24_M$, $24_1$-$24_N$ also has/have such a near-field communication interface 222 such that customer information, e.g., customer identification information in the form of one or more identification codes, user names, passwords, or the like, and/or customer payment information, e.g., credit/debit card information or the like, can be transferred from the mobile communication device 16 to such one or more point-of-sale systems $24_1$-$24_M$, $24_1$-$24_N$ by tapping the two near-field communication devices together or by passing the near-field communication 320 device of the mobile communication device 16 sufficiently close to the near-field communication interface 222 to effectuate such communication. In addition to, or alternatively to, the number of peripheral devices 40 of the local hub server $22_1$ described above, the number of peripheral devices 314 of the mobile communication device 16 may include any number of other or additional peripheral or interface devices. One example of such an additional peripheral device illustrated in FIG. 3A includes, but should not be limited to, a conventional visual display unit or screen 322.

User Computing Device Components

Referring now to FIG. 3B, an embodiment of one of the user computing devices 18 illustrated in FIG. 1 is shown, which includes components similar to the main server 12 and also to the one or more local hub servers $22_1$-$22_L$, the one or more mobile communication devices $16_1$-$16_J$, and to the one or more POS systems $24_1$-$24_M$, $24_1$-$24_N$, such as a processor 350, an I/O subsystem 352, a memory 354 including an EMS module 358, a data storage device 356, communication circuitry 360 and a number of peripheral devices 362. In some embodiments, each of the foregoing components may be identical to corresponding components of the local hub server $22_1$ and/or POS system 24 and/or mobile communication device 16 described above, and a detailed explanation of such components will not be repeated here for brevity. In other embodiments, any of the one or more user computing devices $18_1$-$18_K$ may be configured differently than the local hub server $22_1$, point-of-sale system 24 and/or mobile communication device 16 described above. It will be appreciated that the user computing device 18 may include other components, sub-components, and devices commonly found in a computer and/or computing device. In any case, the communication circuitry 360 illustratively includes conventional wireless communication circuitry 364 configured to facilitate communication with the main server 12 via the network 14, and the user computing device 18 may use any suitable communication protocol to communicate with the main server 12. In addition to, or alternatively to, the number of peripheral devices 40 of the local hub server $22_1$ and/or the number of peripheral devices 212 of the POS system 24 and/or the number of peripheral devices 314 of the mobile communication device 16 described above, the number of peripheral devices 362 of the user computing device 18 may include any number of other or additional peripheral or interface devices. One example of such an additional peripheral device illustrated in FIG. 3B includes, but should not be limited to, a conventional visual display unit 366.

Main Server Environment

Figure 4:
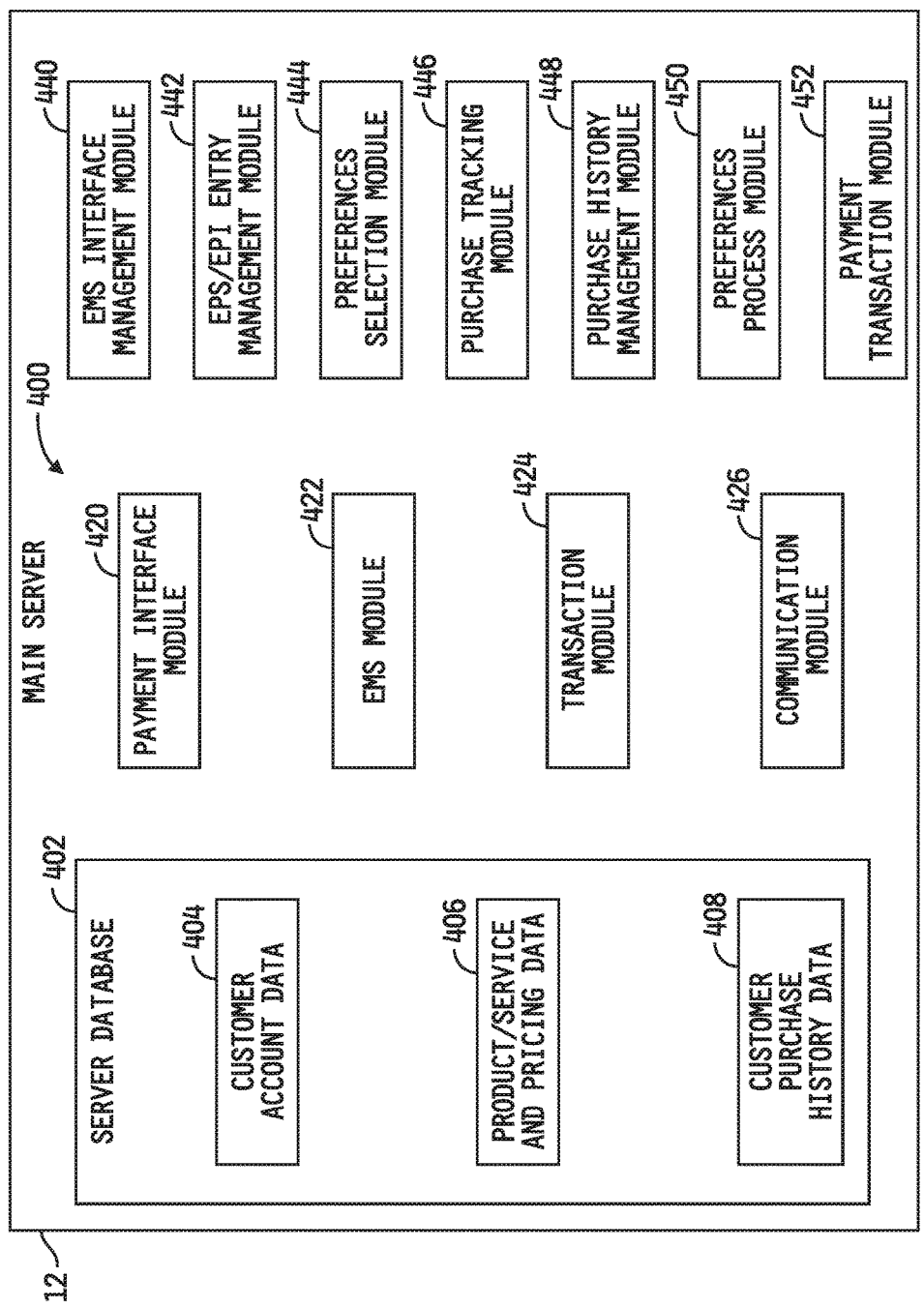
FIG. 4 is a simplified block diagram of an embodiment of an environment of the main server of FIG. 1.

Referring now to FIG. 4, a simplified block diagram is shown of an embodiment of an environment 400 of the main server 12 illustrated in FIG. 1. In the embodiment shown in FIG. 4, the environment 400 includes a server database 402 which illustratively includes customer account data 404, product/service and pricing data 406 and, in some embodiments, a customer purchase history data 408.

The main server 12 illustratively hosts, manages and maintains an enterprise member or membership services (EMS) program. As used herein, the term "enterprise member services program," "enterprise membership services program" or "EMS" are interchangeable and refer to one or more services offered by the retail enterprise 11 to customer members thereof. Examples of such services may include, but are not limited to, making available to customer members via the main server 12 one or more virtual discount coupons redeemable by the retail enterprise 11, tracking and maintaining with the server 12 of customer purchase histories, i.e., histories of products and/or services purchased by customer members over time, in the customer purchase history database 408, and the like.

In embodiments in which the server 12 offers via the EMS program virtual discount coupons to customer members, the server database 402 may include a virtual discount coupon repository which contains for each customer member a plurality of virtual discount coupons provided to thereto by the server 12 from a virtual discount coupon database, and which identifies for each customer member one or more virtual discount coupons which may be selected or "clipped" by the customer member for automatic redemption via the customer virtual discount coupon repository during subsequent qualifying purchases made via one of the POS systems $24_1$-$24_M$, $24_1$-$24_N$. Illustratively, virtual discount coupons stored in the virtual coupon database are, in some embodiments, received from an external source, although in other embodiments the virtual discount coupons stored in the virtual coupon database may alternatively or additionally be generated by the processor 50 of the main server 12. In any case, customer members of the EMS program may redeem such virtual discount coupons stored or identified in the customer's virtual discount coupon repository 306 by presenting such virtual discount coupons at a POS $24_1$-$24_M$, $24_1$-$24_N$ against the purchase of from the retail enterprise 11 of various goods and/or services.

Customers may elect to participate in such an enterprise membership services (EMS) program offered, managed and maintained by the main server 12 of the retail enterprise 11 by establishing a user account within the customer account database 404. In this regard, the terms "customer membership account" and "EMS account" are interchangeable and refer to a collection of information about a customer member of the EMS program that is stored in the customer account data 404 separately from such collections of information about other customer members of the EMS program. In one embodiment, the customer account data 404 of the server database 402 illustratively has stored therein one or more access codes and profile data for each customer member of the EMS program. As customers join the EMS program, the server 12 establishes an EMS account within the customer account data 404 that is unique to the customer, and assigns to the customer, and/or the customer selects, a unique, corresponding enterprise membership services identification code, EMSID. The EMSID associated with each customer is stored by the server 12 along with the customer's profile data in the customer account data 404, and can be used by the customer member thereafter to access the customer's EMS account.

The term "EMS identification code" or EMSID illustratively refers to at least one collection of letters, symbols and/or numbers that is different for, and therefore unique to, each customer member of the enterprise membership services program. The EMSID of each customer member of the EMS program is used by the server 12 to uniquely identify that customer's EMS account in the customer account data 404 of the server database 402. The EMSID is further illustratively used by the server 12 to access information about that customer stored and maintained by the main server 12 in the customer account data 404, to access for redemption one or more virtual coupons selected or "clipped" by the customer and stored in that customer's virtual discount coupon repository in embodiments which include such virtual discount coupons as part of the EMS program, and to also access and/or update that customer's purchase history stored in the customer purchase history data 408. In one example embodiment, the EMSID for each customer member of the EMS program may include a unique, several-digit access code and a separate and unique, several-digit password, although in other embodiments the EMSID may include more, fewer and/or different codes and/or passwords.

The customer account data 404 illustratively further includes additional information relating to the customer members of the EMS program. Examples of such additional information may include, but are not limited to, customer name, customer address, digital image of the customer, communication information (CI) of one or more mobile communication devices 16 carried by the customer, and the like. The communication information, CI, of any customer mobile communication device 16 stored in the customer account data 404 may be or include any information via which another communication device or system may establish wireless communications, e.g., text or other wireless signal communications, with that mobile communication device 16. In one example embodiment in which the mobile communication device 16 is a mobile phone, the communication information (CI) may be or include the telephone number of the customer's mobile phone 16. In other embodiments, the communication information (CI) may be or include a serial number, electronic identification code or other communication identifier associated with the customer's mobile communication device 16 via which another communication device or system may establish wireless communications with that mobile communication device 16. In any case, all such customer information for each customer member is illustratively associated, i.e., linked or mapped together, in the customer account data 404 such that a search by the server 12 of one customer-specific parameter will provide access to the other customer parameters linked thereto in the customer account data 404. Likewise, the purchase history stored in the customer purchase history data 408 for each customer member of the EMS program is linked or mapped to that customer member's information stored in the customer account data 404 such that a search by the server 12 of any customer-specific parameter in the customer account data 404 will link, and therefore provide access, to that customer's purchase history stored in the customer purchase history data 408 and vice versa.

In some embodiments, the EMSID may be provided on or as part of one or more of a customer ID card, an ID associated with an RFID tag, which RFID tag may be part of NFC communication circuitry 320 of the customer's mobile communication device 16 in embodiments that include such circuitry, a customer's shopping incentive card, or the like. In other embodiments, the EMSID may not be provided in or as part of any tangible form, and may instead be or include one or more easily remembered sequences of numbers, letters, symbols or other characters. In any case, customer members of the EMS program described herein may scan, enter via a keypad or touchscreen or otherwise manually communicate their EMSID and/or other information to the server 12 directly or via to one of the point-of-sale terminals $24_1$-$24_M$, $24_1$-$24_N$. In some embodiments, for example, when a customer member provides the customer's EMSID to one of the point-of-sale system $24_1$-$24_M$, $24_1$-$24_N$ as part of a purchase transaction (e.g., during the purchase transaction or as part of the process of commencing the purchase transaction), the processor 200 of the point-of-sale system $24_1$-$24_M$ communicates the EMSID to the main server 12 which identifies the customer via the EMSID and associates that customer with the current purchase transaction being carried out at the corresponding point-of-sale system $24_1$-$24_M$, $24_1$-$24_N$. Illustratively, all such purchase transaction data relating to items purchased by such an identified customer during a purchase transaction carried out via one of the point-of-sale system $24_1$-$24_M$, $24_1$-$24_N$ is stored in the customer's purchase history data 408 where it is associated with the identified customer via the customer's EMSID. Illustratively, the purchase transaction data stored in the customer purchase history data 408 may include, but is not limited to, product/service identification information, product/service pricing, product purchase date and time, total quantity of products purchased, total quantity of identical products purchased, total transaction price, and the like, and purchases made by the customer through the retail enterprise 11 are thus monitored and tracked by the main server 12. It is through the customer's EMSID that the main server 12 also makes virtual discount offers available to the customer and that the customer may redeem virtual discount coupons stored or identified in the customer's virtual discount coupon repository against purchases of products and/or surfaces.

The main server 12 illustratively includes an EMS module 422 configured to control and manage customer EMS accounts and EMS-related activity of customer members of the EMS program. In one embodiment, the EMS module 422 manages and controls a customer-member interface, e.g., a web-based interface, to the EMS program via which customers can access and manage their individual EMS accounts stored in the customer account database 404 and via which customers can select or "clip" virtual discount coupons in the virtual discount database for inclusion or identification in the customer's virtual coupon repository. Illustratively, each customer may access their individual (and private from other customer-members) EMS account, i.e., their individual EMS page(s) within the web-based EMS interface, which may be referred to herein as an "EMS website" or "EMS web portal," by entering that customer's EMSID into a graphic user interface element of the web-based EMS interface. Therein, the customer may establish, access, modify and otherwise manage the customer's EMS account information including, for example, but not limited to, name, address, email address, mobile telephone number, photograph of the customer or the like.

Illustratively, a software application program is available for download from the main server 12 via the public network 14 for customers electing to access the EMS program via their mobile communication device, e.g., one of the mobile communication devices $16_1$-$16_J$, or via their user computing device, e.g., one of the user computing devices $18_1$-$18_K$. Once downloaded and activated, shoppers can access and manage their EMS account and program features via the network 14 with the software application program executed by a computing device $18_1$-$18_K$ and/or by a mobile communication device $16_1$-$16_J$ if the latter is equipped with a web browser. Such a software application program is illustratively stored in the EMS module 308 of the customer's mobile communication device 16, as illustrated in FIG. 3A, and is executable by the processor 300 of the customer's mobile communication device 16, and/or is stored in the EMS module 358 of the customer's user computing device 18, as illustrated in FIG. 3B, and is executable by the processor 350 of the customer's user computing device 18.

As used herein, a "customer membership account" or "EMS account" may in some cases be an individual account accessible only by an individual person, e.g., an individual customer, and in other cases may be a group or "household" account accessible by each of a plurality of members of a predefined group of persons, e.g., members of a family or household, one or more employees of a business enterprise, etc. The terms "member," "customer member," "customer" and "household," and variants thereof, are used interchangeably in the following description, and such terms should be understood to refer interchangeably to an individual customer or a predefined group of individual customers (referred to herein as a "household") who shop at and purchase items from the retail enterprise 11, and who are members of an enterprise membership service (EMS) of the type described herein and provided and managed by the retail enterprise 11, i.e., by the server 12. MPERKS®, a virtual customer coupon collection and redemption program offered to customers by Meijer, Inc. of Grand Rapids, Mich., is an example of one such EMS program of the type described herein, although it will be appreciated that any retail enterprise membership service which offers virtual discount coupons and/or other benefits to customer members, and/or which tracks items purchased by customer members during item purchase transactions at point-of-sale systems or terminals may be alternatively be used.

The product/service and pricing data 406 contains information relating to the retail products and services sold by the retail enterprise 11 which the main server 12 serves. Illustratively such information may include, but is not limited to, product/service description information including product/service manufacturer, product/service family or brand, primary product type (e.g., canned tomatoes), secondary product type (e.g., canned diced tomatoes), tertiary product type (e.g., canned diced tomatoes Italian style), etc., product container size (e.g., 12 oz. can, 32 oz. can, 16 oz. package, etc.), product/service pricing information, product/service unit pricing information, current product inventory, ordered product data, product sales history, product/service location within the corresponding retail outlet, and the like. Illustratively, product/service pricing information is linked to product/service identification information via scan codes, e.g., scannable bar codes such as Universal Product Codes (UPC) or the like, such that when items are scanned for purchase, the scan code of each item will identify a particular item at a particular price in the product/service and pricing database 406.

The environment 400 of the main server 12 further includes a payment interface module 420, a transaction module 424 and a communication module 426. In one embodiment, the payment interface module 420 is configured, in a conventional manner, to process tangible forms of electronic payment systems (EPS), e.g., tangible electronic funds transfer instruments such as credit cards, debit cards, etc., used at the point-of-sale systems $24_1$-$24_M$, $24_1$-$24_N$. In an example of such embodiments, the payment interface module 420 illustratively is or includes a conventional magnetic strip reading device configured to read payment information stored in magnetic form on a strip affixed to a conventional credit or debit card. Alternatively or additionally, the payment interface module 420 may be or include the NFC interface 220, and in such embodiments the NFC interface 220 is configured to access, via contact or near-contact with a portable electronic device having a like-configured NFC device 320, electronically readable customer payment system (EPS) information stored on or accessible by the portable electronic device.

The transaction module 424 is configured to monitor purchases of products and services made by shopper members of the EMS program using any of the point-of-sale systems $24_1$-$24_M$, $24_1$-$24_N$, and to store purchase transaction data associated with such purchases in the customer purchase history database 408. Illustratively, the customer purchase history database 408 is partitioned or otherwise configured to store such purchase transaction data in a manner that provides for the separate tracking and identification of some or all of the shopper purchase history of each shopper (or household) member.

The communication module 426 is configured, in a conventional manner, to control and manage all communications between the main server 12 and the local hub servers $22_1$-$22_L$ in embodiments that include the local hub servers $22_1$-$22_L$, and to control and manage all communications between the main server 12 and all point-of-sale systems $24_1$-$24_M$, $24_1$-$24_N$ in embodiments that do not include a local hub server $22_1$-$22_L$.

The customer payment interface 214 and item scanner 216, and in some embodiments the NFC interface 22, of the point-of-sale systems $24_1$-$24_M$, $24_1$-$24_N$, together with the payment interface module 420 of the main server 12, make up a product purchase interface, a customer-accessible portion of which is provided in the at the point-of-sale terminals or systems $24_1$-$24_M$, $24_1$-$24_N$ physically located at a brick-and-mortar location of the business enterprise. In some embodiments, the payment interface module 420 and the transaction module 424 of the main server 12 are operable to control all purchase transactions made at any of the point-of-sale systems $24_1$-$24_M$, $24_1$-$24_N$, and in such embodiments the processors 200 of the point-of-sale systems $24_1$-$24_M$, $24_1$-$24_N$ are operable to control the various peripheral devices 212 based on instructions from the processor 50 of the main server and to provide information relating to purchase transactions taking place at the point-of-sale systems $24_1$-$24_M$, $24_1$-$24_N$ back to the processor 50. In other embodiments, the processors 200 of the point-of-sale systems $24_1$-$24_M$, $24_1$-$24_N$ may control some or all aspects of the purchase transactions made thereat. The communication module 426 controls and manage all communications between the main server 12 and the local hub servers $22_1$-$22_L$ via the network 20 (an to thereby control and manage all communications between the main server 12 and the point-of-sale systems $24_1$-$24_M$, $24_1$-$24_N$), all communications between the main server 12 and the mobile communication devices $16_1$-$16_J$ via the network 14 and all communications between the main server 12 and the user computing devices $18_1$-$18_K$ via the network 14.

Figure 5A:
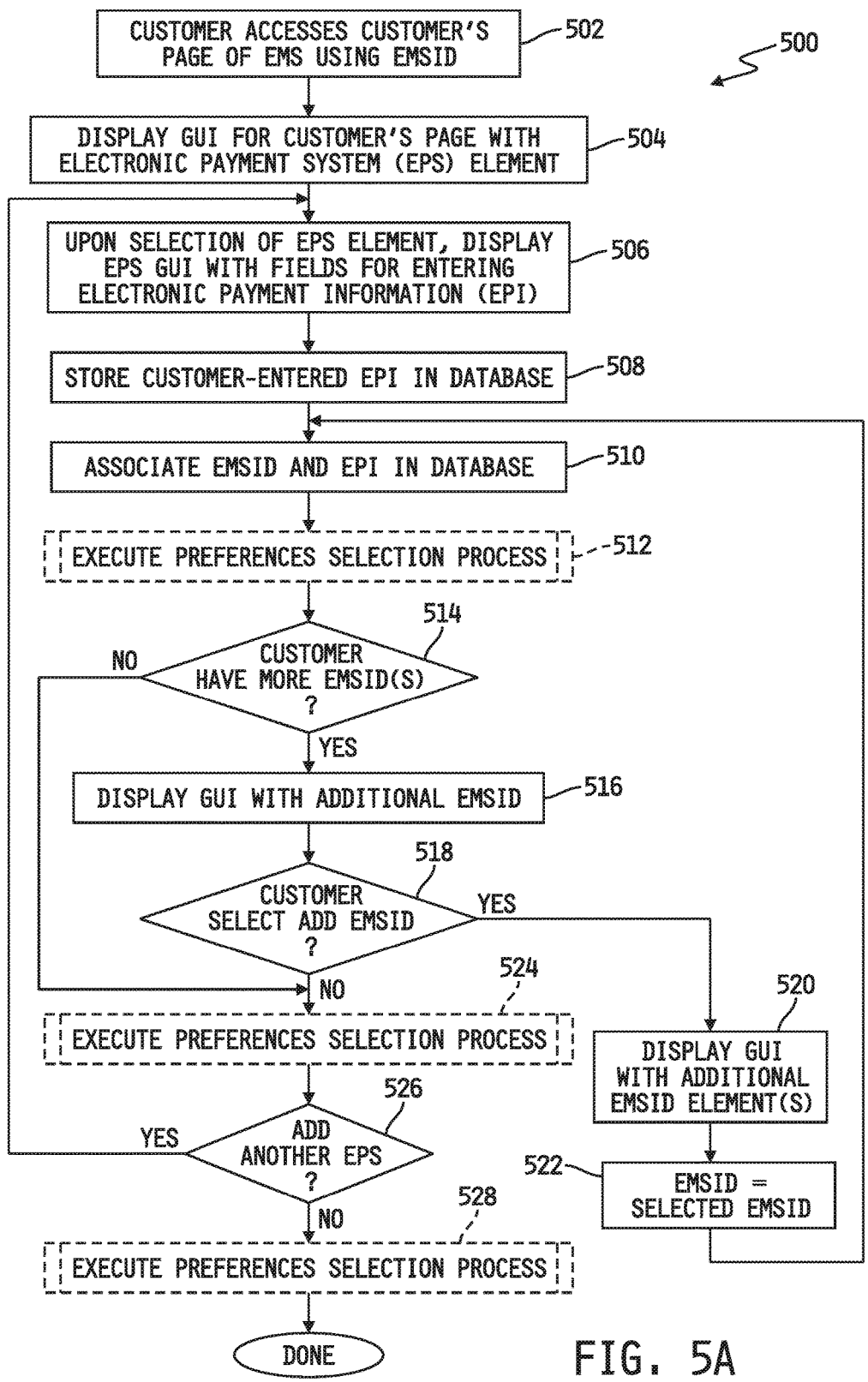
FIG. 5A is a simplified flow diagram of an embodiment of a process for facilitating entry by customers into their enterprise membership accounts electronic payment information for one or more electronic payment systems and for creating unique codes for each.

The environment 400 of the main server 12 further includes one or more of an EMS interface management module 440, an EPS/EPI entry management module 442, a preferences selection module 444, a purchase tracking module 446, a purchase history management module 448 and a preferences process module 450. The EMS interface management module 440 is illustratively operable to provide, control and manage a customer interface to the EMS program, e.g., a web-based EMS interface or EMS website. The EPS/EPI entry module 442 is illustratively operable to provide and control via the EMS program, e.g., as part of each customer member's EMS page(s) within a web-based EMS interface or EMS website, a graphic user interface for use by customer members to enter into their EMS accounts electronic payment information (EPI) for one or more electronic payment systems (EPS), e.g., one or more credit cards, debit cards or the like, and to associate or link the entered EPI(S) with one or more corresponding customer's EMSID(S) within the customer account data 404. In some embodiments, the graphic user interface provided by the EPS/EPI module 442 may be additionally configured to facilitate customer selection and entry of one or more customer preferences. An example embodiment of a process 500 executed by the EMS interface management module 440 and the EPS/EPI entry module 442, or executed by the EPS/EPI entry management module 442 alone, is illustrated in FIG. 5A, and the illustrated process 500 will be described in detail hereinafter.

Figure 5B:
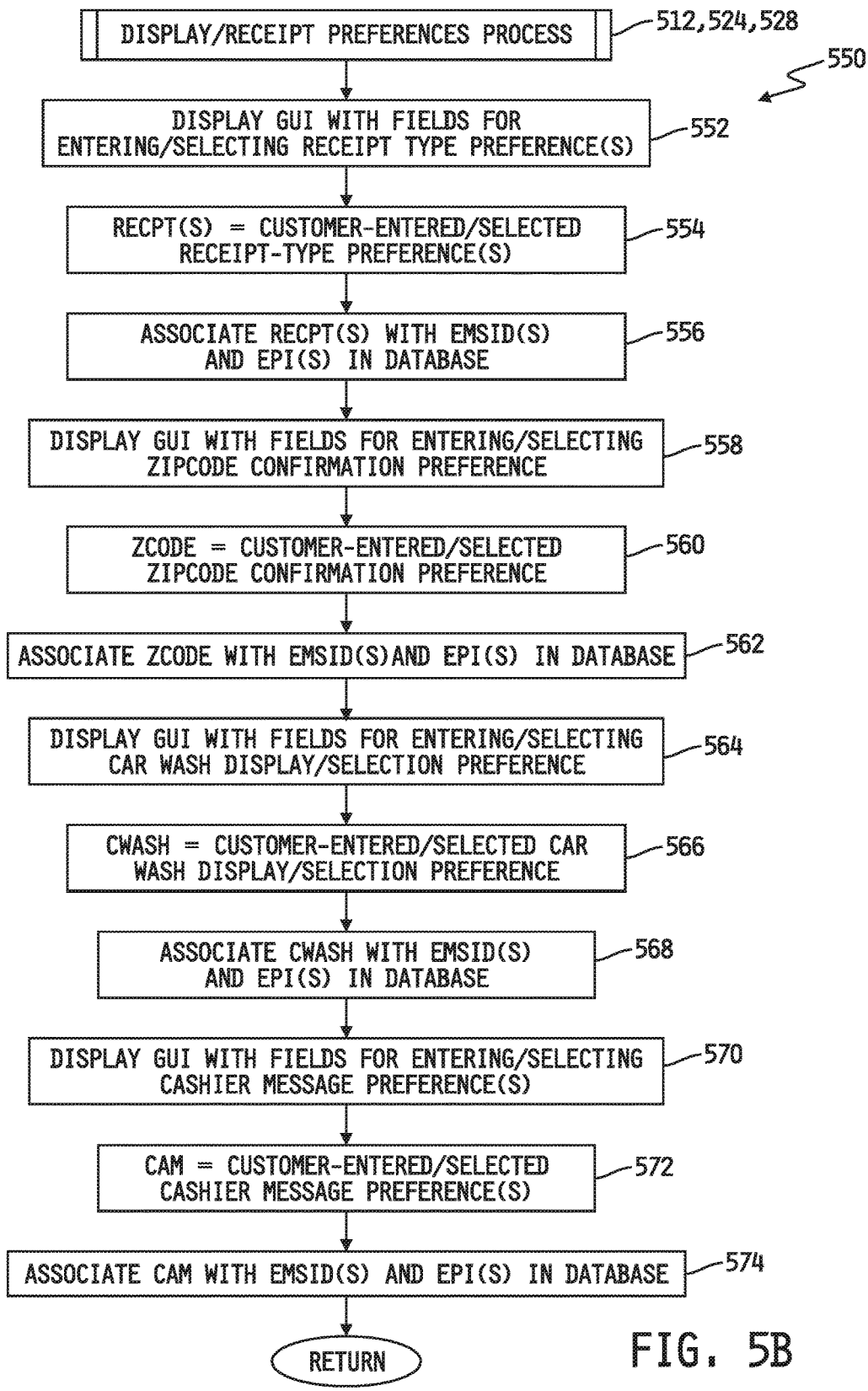
FIG. 5B is a simplified flow diagram of an embodiment of a process for facilitating entry by customers into their enterprise membership accounts display/receipt preferences to be associated in their enterprise membership accounts with one or more electronic payment systems.

The preferences selection module 444 is illustratively operable to provide and control via the EMS program, e.g., as part of each customer member's EMS page(s) within a web-based EMS interface or EMS website, a graphic user interface for use by customer members to select one or more display/receipt preferences to be linked in their EMS accounts to one or more EPS/EPI and EMSID pairs. An example embodiment of a display/receipts preferences process 550 executed by the preferences selection module 444 is illustrated in FIG. 5B, and the illustrated process 550 will be described in detail hereinafter.

The SEPS payment processing module 448 is illustratively operable to execute a payment transaction process of matching EMSIDs and security codes presented by customers or other users to point-of-sale systems $24_1$-$24_M$, $24_1$-$24_N$ during item purchase transactions with corresponding EPI codes and EMSIDs stored in a database and associated with EPS/EPIs selected by the customers as payment for the item purchase transactions. Several example embodiments of processes executed by the SEPS payment processing module 448 are illustrated in FIGS. 8B, 10B and 11B, and such processes will each be described in detail hereinafter.

The payment transaction module 450 is illustratively operable to control the various point-of-sale systems $24_1$-$24_M$, $24_1$-$24_N$, e.g., solely or jointly with the processors 200 of the point-of-sale systems $24_1$-$24_M$, $24_1$-$24_N$ and/or the processor 30 of a corresponding local/hub server 22, to effect payment, or at least partial payment, for at least one or more items in transactions for the purchase of one or more items at one of the point-of-sale systems $24_1$-$24_M$, $24_1$-$24_N$ of the retail enterprise 11 made in accordance with a stored electronic payment system, SEPS, i.e., an electronic payment system EPS previously selected or entered into the customer's enterprise membership service (EMS) account. An example embodiment of a payment transaction process 900 executed by the payment transaction module 450 is illustrated in FIG. 9, and the illustrated process 900 will be described in detail hereinafter.

Figure 6:
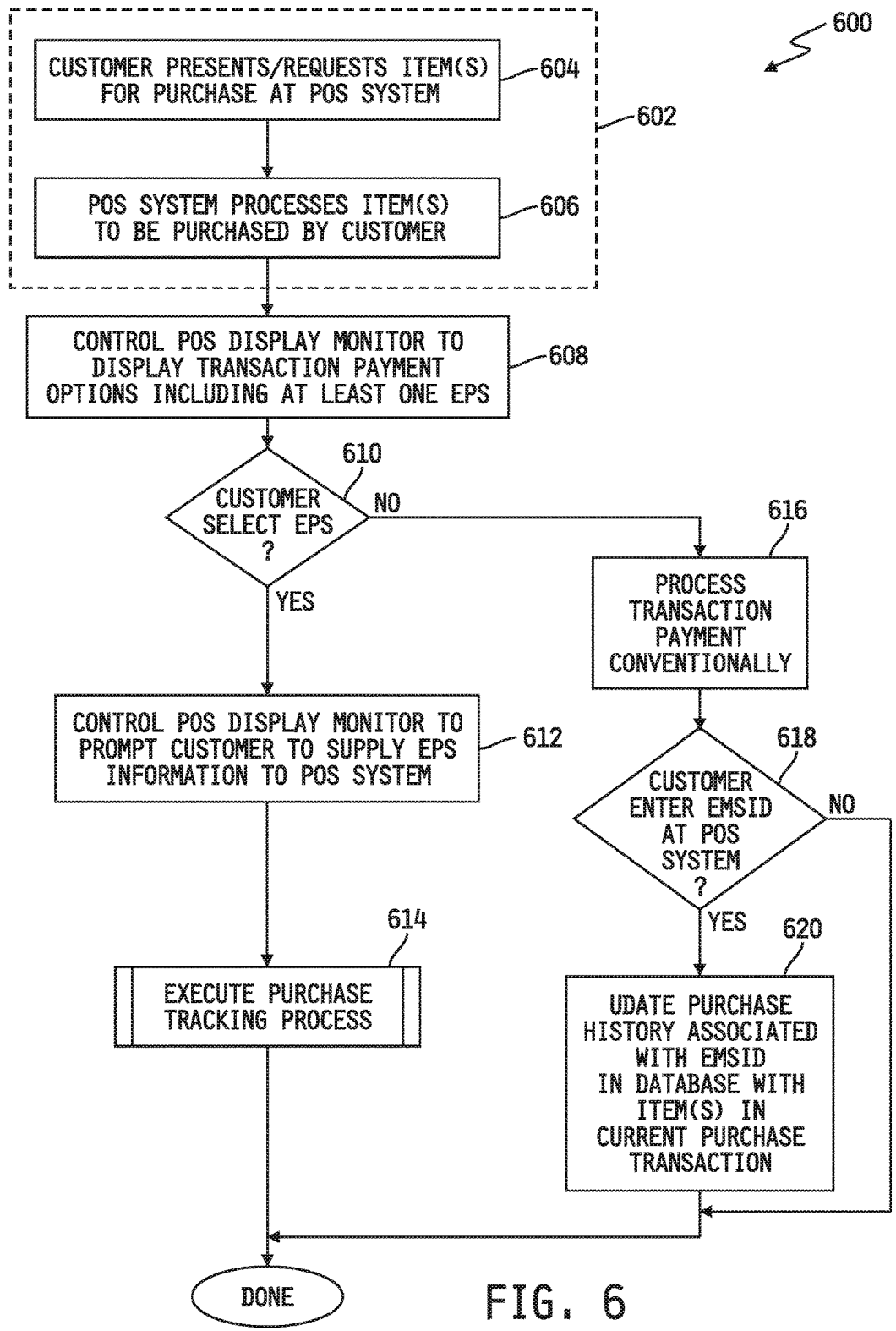
FIG. 6 is a simplified flow diagram of an embodiment of a process for linking purchases made by a customer to the customer's shopper membership account during a purchase transaction between the customer and a retail enterprise at a point-of-sale system.

The payment transaction module 452 is illustratively operable to is illustratively operable to control the various point-of-sale systems $24_1$-$24_M$, $24_1$-$24_N$, e.g., solely or jointly with the processors 200 of the point-of-sale systems $24_1$-$24_M$, $24_1$-$24_N$ and/or the processor 30 of a corresponding local/hub server 22 during a transaction for the purchase of one or more items at one of the point-of-sale systems $24_1$-$24_M$, $24_1$-$24_N$ of the retail enterprise 11. An example embodiment of a purchase transaction process 600 executed by the payment transaction module 450 is illustrated in FIG. 6, and the illustrated process 600 will be described in detail hereinafter The purchase history management module 448 is illustratively operable to link to a customer member's purchase history data 408 all purchases made by the customer member at a purchase interface of the retail enterprise 11 to which the customer supplies the customer's EMSID, and to identify all purchase transactions made by the customer member using an electronic payment system (EPS) at a purchase interface of the retail enterprise 11 to which the customer does not supply the customer's EMSID, e.g., in accordance with the process 600 illustrated in FIG. 6.

Figure 7:
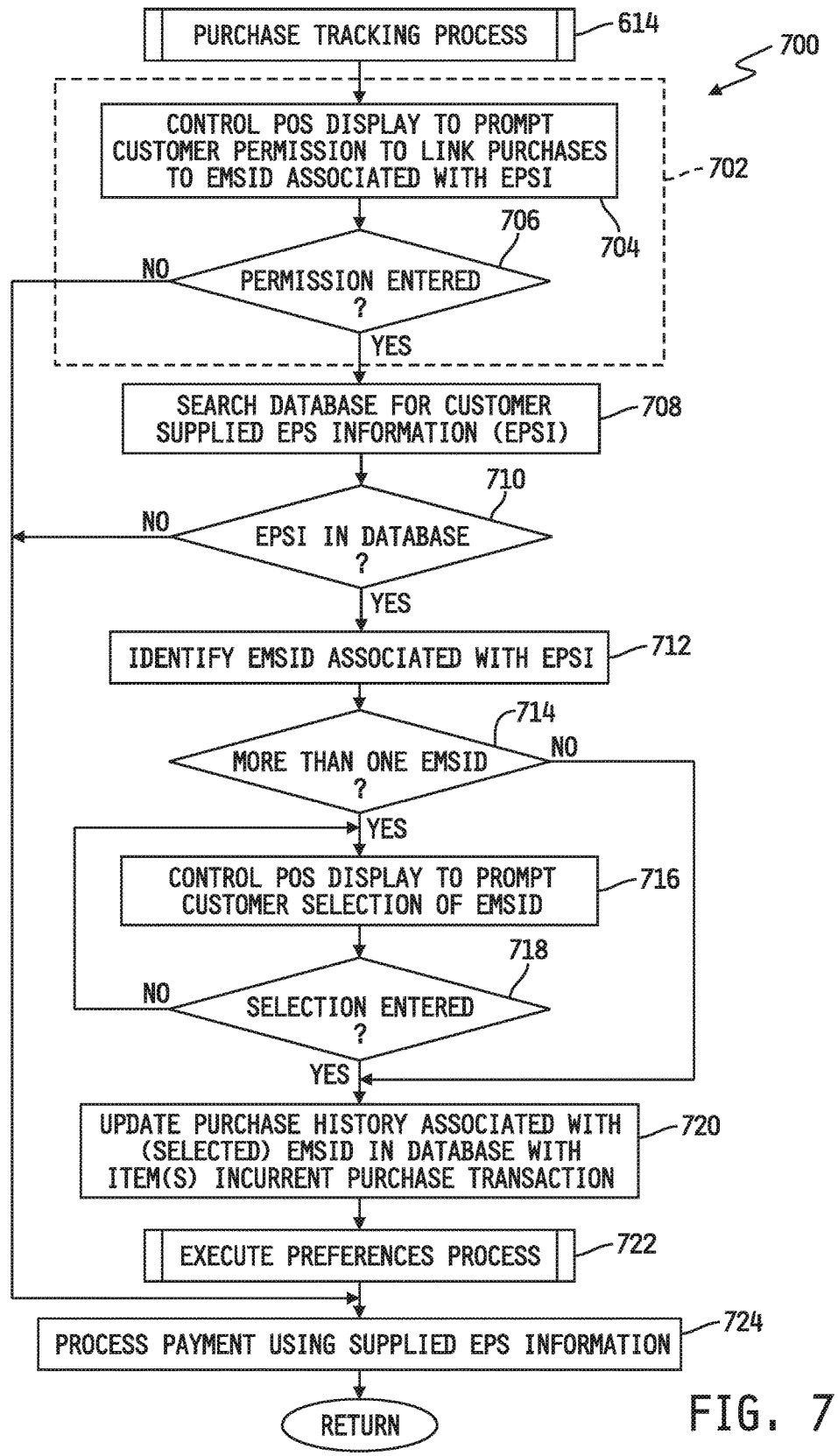
FIG. 7 is a simplified diagram of an embodiment of the purchase tracking process executed as part of the process illustrated in FIG. 6.

The purchase tracking module 444 is illustratively operable to automatically implement customer-selected preferences during purchase transactions and to automatically link to a customer member's purchase history data 408 all purchases made by the customer member at a purchase interface of the retail enterprise 11 using an electronic payment system (EPS) that matches electronic payment information (EPI) previously stored in the customer's EMS account data 404. An example embodiment of such a process 700 executed by the purchase tracking module 450 is illustrated in FIG. 7, and the illustrated process 700 will be described in detail hereinafter. By tendering payment for purchases at the retail enterprise 11 using an electronic payment system (EPS) that has been previously linked to a customer's EMSID, the customer is advantageously relieved of the burden of manually supplying the customer's EMSID to the purchase interface as the main server 12 automatically links such purchases to the customer's purchase history data 408.

EPS/EPI Entry Process

Referring now to FIG. 5A, a simplified flow diagram is shown depicting an embodiment of a process 500 for facilitating entry by customers into their EMS accounts, e.g., within the customer account data 404 of the database 402, electronic payment information (EPI) for one or more electronic payment systems (EPS) and for linking any such EPI to one or more customer-supplied EMSIDs. The process illustrated in FIG. 5A further illustratively includes a process for selecting one or more customer preferences, some examples of which are illustrated in FIG. 5B and will be described in detail hereinafter. Such one or more customer preferences are illustratively used during the processing of customer purchase transactions at any of the POS systems $24_1$-$24_M$, $24_1$-$24_N$ to automatically carry out one or more customer-selected receipt preferences, customer display preferences and/or cashier message preferences.

In one embodiment, the process 500 is or includes the EMS interface management module 440 and/or the EPS/EPI entry management module 442 stored in the memory 54 (and/or data storage 56) of the main server 12 in the form of instructions executable by the processor 50 of the main server 12. The process steps of the process 500 will thus be described below for purposes of this disclosure as being executed by the processor 50 of the main server 12. It will be understood, however, that in some alternate embodiments, the process 500 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 500 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 500 may be stored, in whole or in part, in a memory of the enterprise server(s) 26 in the form of instructions executable, in whole or in part, by a processor of the enterprise server(s) 26. In any such embodiments, the process 500 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The process 500 begins at step 502 where the processor 50 is operable to determine whether a customer has accessed that customer's page of the EMS interface, e.g., an access page of one or more dedicated and private pages of the EMS website hosted by the main server 12 and associated with or assigned to the customer, using the customer's EMSID or, in some embodiments, using one of multiple EMSIDs associated with or assigned to the customer. Access by the customer of the customer's page of the EMS interface may be accomplished, for example, using a mobile communication device 16 or a user computing device 18. In any case, upon detection of such access by the customer of the customer's page of the EMS interface, the process 500 advances to step 504 where the processor 50 is operable to generate and include for display on the accessed customer's page of the EMS interface a graphic user interface (GUI) which includes at least one electronic payment system (EPS) element. Illustratively, the at least one EPS element includes one or more elements or fields which the customer may select in order to subsequently enter into the customer's EMS account information relating to one or more electronic payment systems (EMS) that the customer uses or may use to tender payment for purchases of items from the retail enterprise 11. Upon detection by the processor 50 of selection by the customer of the at least one EPS element, the process 500 advances to step 506 where the processor 50 is operable to generate and include for display on the accessed customer's page of the EMS interface, or as a new page for display on the accessed customer's page of the EMS interface, an EPS graphic user interface (EPS GUI) with a plurality of fields in which the user can enter electronic payment information (EPI) associated with an EPS. Thereafter at step 508, the customer enters the EPI of a selected EPS into the plurality of EPS GUI fields, and the processor 50 stores the customer-entered EPI, in one embodiment, in the customer's account data 404 in the server database 402. In alternate embodiments, the EPI may be stored, in whole or in part, elsewhere in one or more other databases or memory units within the system 10. In still other embodiments, the EPI may be stored, in whole or in part, in one or more databases or memory units outside of the system 10.

As used herein, the term "electronic payment system" or "EPS" refers generally to any instrument of electronic funds transfer that is identifiable by an account number, card number, access number, code or other identification and that may be used by a customer and accepted by the retail enterprise 11 in the course of a purchase transaction to satisfy payment for items purchased by the customer from the retail enterprise 11 via a one of the point-of-sale systems $24_1$-$24_M$, $24_1$-$24_N$ of the retail enterprise 11. Examples of such instruments of electronic funds transfer include, but are not limited to, credit cards, debit cards, pre-paid credit cards, on-line money transfer accounts, wire transfer accounts, electronic or digital money certificates and/or accounts, ecommerce payment systems, and the like.

As used herein, the term "electronic payment information" or "EPI" refers generally to information uniquely associated with an EPS that identifies that EPS for purposes of transferring funds from the EPS to the retail enterprise 11. In some embodiments, the EPI may be or include an account or identification number or code that identifies the EPS, e.g., a credit card number. In other embodiments, the EPI may include one or more numbers or codes, e.g., a security code, in addition to the identification number or code. Any such "code" referred to in herein will be understood to be a unique combination, at least for purposes of identifying an EPS account, of one or more numerical digits, one or more letters of an alphabet in any language, one or more punctuation symbols and/or one or more symbols other than punctuation symbols.

In still other embodiments, the EPI may include information alternatively to, or in addition to, an account or identification number/code (and, in some embodiments, further alternatively to or in addition to a security number/code), examples of which may include the name of the person to whom the EPS is issued, birthdate of the person to whom the EPS is issued, part or all of the address of the person to whom the EPS is issued, part or all of the billing address of the payer or other funding source of the EPS, contact information, such as one or more telephone or mobile phone numbers, one or more email addresses, etc. of the person to whom the EPS is issued and/or of the payer or other funding source of the EPS, identity of and/or other information about the EPS issuer, the EPS payment processing organization, e.g., Visa®, MasterCard®, etc., or the like. It will be understood that "EPI," as used herein, may be or include one or any combination of any of the foregoing numbers, codes and/or information, and that additional information about the EPS, in addition to EPI, may be required by the process 500 to be entered by the customer into the EPS GUI displayed at step 506. As one specific example, the EPI in one embodiment may be defined completely by a combination of an account or identification number and security code of the EPS, although the process 500 may additionally require some or all of the information just described to be entered into the displayed EPS GUI in order to completely satisfy step 506, i.e., in order for the process 500 to advance from step 506 to step 508.

The process 500 advances from step 508 to step 510 where the processor 50 is operable to associate EMSID and the customer-entered EPI, in one embodiment, in the customer account data 404. In alternate embodiments, the EMSID/EPI code association may be stored, in whole or in part, elsewhere in one or more other databases or memory units within or outside of the system 10. In any case, the processor 50 is illustratively operable to execute step 510 using any one or more conventional data association mechanisms, examples of which include, but are not limited to, a table, a chart, a linked list or other pointer, or the like.

Following step 510, the process 500 advances, in some embodiments, to step 512 where the processor 50 is operable to execute a preferences selection process in which the customer may select or define one or more preferences to be automatically implemented by the processor 50 during the processing of purchase transactions at any of the POS systems $24_1$-$24_M$, $24_1$-$24_N$ using the EPI entered at step 508 in association with the originally entered (or most recently selected) EMSID. Step 512 is illustratively illustrated by dashed-line representation in FIG. 5A to indicate that this step is optional and may be omitted in some embodiments, and/or duplicated or relocated at one or more points in the process 500. In any case, an embodiment of the preferences selection process executed at step 512, in embodiments which include step 512, is illustrated by example in FIG. 5B and will be described in detail hereinafter.

In embodiments which include step 512, the process 500 advances therefrom to step 514, and in embodiments which do not include step 512 the process advances from step 510 to step 514, where the processor 50 is operable to determine whether the customer has been assigned, or is otherwise associated with, one or more additional EMSIDs. If so, the process 500 advances to step 516 where the processor 50 is operable to generate and include for display on the accessed customer's page of the EMS interface a graphic user interface (GUI) which includes at least one selectable GUI element and instructions to selectively add, i.e., link or associate, or not, one of the additional EMSIDs assigned to or otherwise associated with the customer. Thereafter at step 518, the processor 50 is operable to determine, e.g., based on customer selection of the at least one displayed GUI element, whether the customer wishes to add one of the additional EMSIDs. If so, the process 500 advances to step 520 where the processor 50 is operable to generate and include for display on the accessed customer's page of the EMS interface a graphic user interface (GUI) which identifies the one or more EMSIDs assigned to or otherwise associated with the customer. In some embodiments, the processor 50 may be operable to identify the one or more EMSIDs in the form of a selectable menu or list of EMSIDs. In any case, the processor 50 is further illustratively operable at step 520 to include in the displayed GUI instructions to select one of, or the one of, the displayed EMSIDs, and thereafter at step 522 the process 500 loops back to step 510 with the EMSID selected by the customer. In the embodiment, the processor 50 is operable to execute step 522 by assigning an EMSID variable to the customer-selected EMSID, although it will be understood that the processor 50 may alternatively use any conventional technique at step 522 for identifying the customer-selected EMSID. In any case, the processor 50 is thereafter operable at step 510 to associate the customer-selected EMSID with the EPI entered by the customer at step 508, and to then execute step 512 (optionally) and step 514. The sub-process illustrated in steps 510-522 will be executed for each EMSID assigned to or otherwise associated with the customer that the customer wishes to link or otherwise associate with the EPS/EPI combination selected by the customer at step 508. If at any execution of step 514 the processor 50 determines that the customer does not have any additional assigned or otherwise associated EMSIDs, the process 500 advances along the "NO" branch of step 514. Likewise, if at any execution of step 518 the customer declines to link or associate the presently selected EPI with any further EMSIDs assigned to or otherwise associated with the customer, the process 500 advances along the "NO" branch of step 518.

Following the "NO" branch of either of steps 514 and 518, the process 500 advances, in some embodiments in which the process 500 does not include step 512 or does not include the steps 512-522, to step 524 where the processor 50 is operable to execute the preferences selection process in which the customer may select or define one or more preferences to be automatically implemented by the processor 50 during the processing of purchase transactions at any of the POS systems $24_1$-$24_M$, $24_1$-$24_N$ using the EPI entered at step 508 in association with the originally entered, or most recently selected, EMSID in order to automatically carry out one or more customer-selected preferences. Step 524 is illustratively illustrated by dashed-line representation in FIG. 5A to indicate that this step is optional and may be omitted in some embodiments, and/or duplicated or relocated at one or more points in the process 500.

In embodiments which include step 524, the process 500 advances therefrom to step 526, and in embodiments which do not include step 524 the process advances from the "NO" branch of either of steps 514 and 518 to step 526, where the processor 50 is operable to determine whether the customer wishes to specify and enter another EPS/EPI for potential subsequent use as a mechanism of payment for purchases made at the retail enterprise 11. If so, the process 500 loops back to step 506 where the customer is again presented with the EPS GUI within which the customer may enter electronic payment information, EPI, for another electronic payment system, EPS. If, at step 526, the customer does not wish to specify another electronic payment system, EPS, the process 500 advances, in some embodiments, to step 528 where the processor 50 is operable to execute a preferences selection process in which the customer may select or define one or more preferences to be automatically implemented by the processor 50 during the processing of purchase transactions at any of the POS systems $24_1$-$24_M$, $24_1$-$24_N$ using the EPI entered at step 510 in association with the originally entered (or most recently selected) EMSID in order to automatically carry out one or more customer-selected preferences. Step 528 is illustratively illustrated by dashed-line representation in FIG. 5A to indicate that this step is optional and may be omitted in some embodiments, and/or duplicated or relocated at one or more points in the process 500. Following step 528, or following the "NO" branch of step 526 in embodiments which do not include step 528, the process 500 is complete.

The process 500 provides for any number of electronic payment systems, EPS, to be specified by the customer and associated with any one or more ESMIDs assigned to or otherwise associated with the customer, and any such specified EPS may be subsequently selected and used by the customer, in combination with any (selectable) one of the EMSIDs assigned to or otherwise associated with the customer, as payment for a purchase transaction at a point-of-sale system $24_1$-$24_M$, $24_1$-$24_N$ of the retail establishment 11. In some embodiments, the process 500 further allows the customer to select one or more preferences for one, all or any combination of EPI/EMSID pairs as illustrated by one or more of steps 512, 524 and 528.

Display/Receipt Preferences Process

Referring now to FIG. 5B, a simplified flow diagram is shown depicting an embodiment 550 of the preferences selection process executed at one or more of steps 512, 524 and 528 of the process 500 illustrated in FIG. 5A. In the illustrated embodiment, the preference selection process 550 is provided in the form of a display/receipts preferences selection process in which the customer may select one or more display/receipt preferences to be automatically implemented during subsequent processing of purchase transactions at any of the POS systems $24_1$-$24_M$, $24_1$-$24_N$ and conducted in accordance with the EPI/and EMSID combination selected in the process 500 illustrated in FIG. 5A.

In one embodiment, the process 500 is or includes the preferences selection module 444 stored in the memory 54 (and/or data storage 56) of the main server 12 in the form of instructions executable by the processor 50 of the main server 12. The process steps of the process 550 will thus be described below for purposes of this disclosure as being executed by the processor 50 of the main server 12. It will be understood, however, that in some alternate embodiments, the process 550 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 550 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 600 may be stored, in whole or in part, in a memory of the enterprise server(s) 26 in the form of instructions executable, in whole or in part, by a processor of the enterprise server(s) 26. In any such embodiments, the process 550 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The process 550 begins at step 552 where the processor 50 is operable to generate and include for display on the accessed customer's page of the EMS interface a graphic user interface (GUI) which includes one or more fields for entering at least one receipt-type preference or one or more GUI elements for selecting at least one receipt-type preference; i.e., at least one preference for the form of sales receipt to be produced following the purchase transaction. Example receipt-type preferences may illustratively include, but are not limited to, one or more of a hard-copy (i.e., paper) receipt, an email receipt, e.g., emailed by the server 12 to one or more selected email addresses entered by the customer, a text receipt, e.g., sent by the server 12 via a mobile messaging service to one or more mobile communication devices 16 entered by the customer, and the like. Following step 552, the process 550 advances to step 554 where the processor 50 captures the receipt type preference(s) selected and/or entered by the customer at step 552. In the illustrated embodiment, the processor 50 is operable to execute step 554 by assigning at least one receipt-type variable RECPT (S) to the at least one customer selected or entered receipt-type, although it will be understood that the processor 50 may alternatively use any conventional technique at step 554 for capturing the receipt type preference(s) selected and/or entered by the customer at step 552. Thereafter at step 556, the processor 50 is operable to associate the captured receipt type preference(s) selected and/or entered by the customer, e.g., RECPT(S), with the corresponding EPI and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI and EMSID combination, the processor 50 will automatically implement the one or more receipt-type preferences selected and/or entered by the customer at step 552.

The process 550 illustratively advances from step 556 to step 558 where the processor 50 is operable to generate and include for display on the accessed customer's page of the EMS interface a graphic user interface (GUI) which includes one or more fields for entering a zip code confirmation preference or one or more GUI elements for selecting a zip code confirmation preference. In some conventional purchase transactions in which an electronic payment system (EPS) medium, e.g., a credit card, debit card or the like, is used as the form of payment, the payment processing system may require confirmation of the zip code of the billing address of the EPS medium holder before payment can be processed, and in some such cases the holder must manually enter such the zip code into a payment system keypad or touchscreen. The zip code confirmation preferences offered at step 558 illustratively allow the customer to maintain this practice or to instruct the processor 50 to automatically confirm the customer's zip code based on zip code information provided by the customer as part of the EPI information entered by the customer in the process 500 illustrated in FIG. 5A. Following step 558, the process 550 advances to step 560 where the processor 50 captures the zip code preference selected and/or entered by the customer at step 558. In the illustrated embodiment, the processor 50 is operable to execute step 560 by assigning a zip code variable ZCODE to the customer selected or entered zip code preference, although it will be understood that the processor 50 may alternatively use any conventional technique at step 560 for capturing the zip code preference selected and/or entered by the customer at step 558. Thereafter at step 562, the processor 50 is operable to associate the captured zip code preference selected and/or entered by the customer, e.g., ZCODE, with the corresponding EPI and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI and EMSID combination, the processor 50 will automatically implement the zip code preference selected and/or entered by the customer at step 558. If, for example, the customer selects as the zip code preference at step 558 the conventional zip code confirmation process, the customer's zip code will be required to be provided, e.g., via manual entry using a keypad or touchscreen, during subsequent processing of purchase transactions at any of the POS systems $24_1$-$24_M$, $24_1$-$24_N$ which are conducted in accordance with the associated EPI and EMSID combination. If, on the other hand, the customer selects as the zip code preference at step 558 an automatic zip code confirmation process, the processor 50 will automatically confirm the customer's zip code during subsequent processing of purchase transactions at any of the POS systems $24_1$-$24_M$, $24_1$-$24_N$ which are conducted in accordance with the associated EPI and EMSID combination by accessing the customer' zip code information associated in the database with the EPI and EMSID combination.

The process 550 illustratively advances from step 562 to step 564 where the processor 50 is operable to generate and include for display on the accessed customer's page of the EMS interface a graphic user interface (GUI) which includes one or more fields for entering a car wash preference or one or more GUI elements for selecting a car wash preference. In some conventional purchase transactions, e.g., such as at a fuel pump or station, in which an electronic payment system (EPS) medium, e.g., a credit card, debit card or the like, is used as the form of payment, the payment processing system may require the purchaser to elect or decline to add to the purchase total an amount for a car wash to be administered following the fueling purchase, and in some such cases the holder must manually enter the selection into a payment system keypad or touchscreen. The car wash preferences offered at step 564 illustratively allow the customer to maintain this practice, to automatically charge the car wash amount to the EPS identified by the EPI entered by the customer in the process 500 illustrated in FIG. 5A or to automatically decline the car wash offer. Following step 564, the process 550 advances to step 566 where the processor 50 captures the car wash preference selected and/or entered by the customer at step 564. In the illustrated embodiment, the processor 50 is operable to execute step 566 by assigning a car wash variable CWASH to the customer selected or entered car wash preference, although it will be understood that the processor 50 may alternatively use any conventional technique at step 566 for capturing the car wash preference selected and/or entered by the customer at step 564. Thereafter at step 568, the processor 50 is operable to associate the captured car wash preference selected and/or entered by the customer, e.g., CWASH, with the corresponding EPI and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI and EMSID combination, the processor 50 will automatically implement the car wash preference selected and/or entered by the customer at step 564, e.g., by continuing to prompt for a car wash selection at each such purchase transaction in accordance with the conventional process, by automatically charging at each such purchase transaction the EPS identified by the EPI for a car wash without prompting for selection thereof according to the conventional process, or by automatically declining a car wash at each such purchase transaction without prompting for selection thereof as in the conventional process according to the conventional process.

The process 550 illustratively advances from step 568 to step 570 where the processor 50 is operable to generate and include for display on the accessed customer's page of the EMS interface a graphic user interface (GUI) which includes one or more fields for entering one or more cashier message preferences or one or more GUI elements for selecting one or more cashier message preferences. As described hereinabove, some embodiments of the POS systems $24_1$-$24_M$, $24_1$-$24_N$ may include a number of display monitors 218, and at least such display monitor 218 may be or include a cashier display monitor 218 controllable by the processor 50 of the main server 12, the processor 30 of the corresponding local hub server 22 and/or the processor 200 of the POS system 24 to display information to the cashier or POS attendant. In such embodiments, the one or more cashier message preferences which may be selected or entered by the customer at step 570 will be automatically implemented by the processor 50 by controlling the cashier display monitor 218 to display one or more corresponding messages, instructions or other information to the cashier or POS attendant each time a purchase transaction is conducted at such a POS system in accordance with the associated EPI and EMSID combination. Examples of such cashier messages that may be selected or entered by the customer at step 570 may include, but are not limited to, instructions to verbally offer lottery tickets to the customer, instructions to automatically charge and provide the customer with some predesignated number of lottery tickets, instructions to verbally offer the customer postage stamps, instructions to automatically charge and provide the customer with some predesignated number or rolls of postage stamps, instructions to automatically select, e.g., without asking the customer to select, the form or style of bags to be used in the bagging area, e.g., paper or plastic, instructions to automatically charge and provide product warranties for products being purchased with optional warranties, instructions to refrain from asking the customer whether the customer wishes to pay for product warranties for products being purchased with optional warranties, information relating to physical or other disabilities of the customer, the customer's name, the customer's birthday, instructions to verbally provide the customer with prescription refill reminders and/or prescriptions ready for pickup, notification of, and information relating to, government assistance payment forms, e.g., government assistance EPS number(s) and/or code(s), split tender payment instructions, etc., instructions or notifications of preferred dialog level with customer, e.g., free dialog, minimal dialog, etc., and the like. Those skilled in the art will recognize other instructions, messages, notifications and/or other information that the customer may select to be automatically displayed to the cashier or POS attendant, and it will be understood than any such other instructions, messages, notifications and/or other information is contemplated by this disclosure.

Following step 570, the process 550 advances to step 572 where the processor 50 captures the cashier message preference(s) selected and/or entered by the customer at step 570. In the illustrated embodiment, the processor 50 is operable to execute step 572 by assigning a cashier message variable CAM to each customer selected or entered cashier message preference, although it will be understood that the processor 50 may alternatively use any conventional technique at step 572 for capturing the cashier message preference(s) selected and/or entered by the customer at step 572. Thereafter at step 574, the processor 50 is operable to associate the captured cashier preference(s) selected and/or entered by the customer, e.g., CAM, with the corresponding EPI and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI and EMSID combination, the processor 50 will automatically implement the cashier message preference(s) selected and/or entered by the customer at step 620, e.g., by controlling the cashier display 218 to display one or more corresponding messages, instructions, notifications and/or other information.

The process 550 is illustrated in FIG. 5B and described herein as including a sequence of four different selectable display/receipt preferences, i.e., a receipt type preference(s), a zip code confirmation preference, a car wash preference and a cashier message preference(s). It will be understood, however, that alternative embodiments of the process 550 may include more, fewer, different or different combinations of such selectable preferences, and that any such alternative embodiments of the process 550 are contemplated by this disclosure. For example, in some conventional purchase transactions in which an electronic payment system (EPS) medium, e.g., a credit card, debit card or the like, is used as the form of payment, the payment processing system may require the purchaser to elect or decline to include in the transaction a monetary amount that the retail enterprise 11, e.g., via a cashier or attendant, will immediately provide to the user in the form of cash, e.g., a "cash back" amount, and in such cases the customer must typically enter the selection and amount, if any, into a payment system keypad or touchscreen. In some embodiments, the display/receipt preferences process 550 may illustratively include one or more additional cash back preferences steps, e.g., similar to those which implement the car wash preference, which operate to allow the customer to maintain the conventional practice just described, to automatically charge a defined monetary amount such that the customer always receives the defined amount of cash as part of every purchase transaction or to automatically decline the cash back offer at each such purchase transaction without the processor 50 controlling a POS display 218 and/or display of a POS purchase interface 214 to prompt for selection thereof as in the conventional process.

Purchase Transaction Process

Referring now to FIG. 6, a simplified flow diagram is shown depicting an embodiment of a purchase transaction process 600 for linking to a customer member's purchase history data 408 all purchases made by the customer member at a purchase interface of the retail enterprise 11 to which the customer supplies the customer's EMSID, and to identify all purchase transactions made by the customer member using an electronic payment system (EPS) at a purchase interface of the retail enterprise 11 to which the customer does not supply the customer's EMSID but which was previously linked to the customers' EMSID via execution of the process 500 illustrated in FIG. 5A. In one embodiment, the process 600 is or includes the payment transaction module 452 stored in the memory 54 (and/or data storage 56) of the main server 12 in the form of instructions executable by the processor 50 of the main server 12, and the process steps of the process 600 will be described below for purposes of this disclosure as being executed by the processor 50 of the main server 12. It will be understood, however, that in some alternate embodiments, the process 600 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 600 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 600 may be stored, in whole or in part, in a memory of the enterprise server(s) 26 in the form of instructions executable, in whole or in part, by a processor of the enterprise server(s) 26. In any such embodiments, the process 600 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

In embodiments in which a customer presents one or more items for purchase at a point-of-sale system $24_1$-$24_M$, $24_1$-$24_N$ of the retail enterprise 11 and then subsequently tenders payment during or after the point-of-sale system $24_1$-$24_M$, $24_1$-$24_N$ processes the one or more items, such as may typically occur during a purchase of one or more items at a brick-and-mortar outlet having a number of different types of items in inventory, the process 600 illustratively begins at step 602 which may include steps 604 and 606. At step 604, the customer presents one or more items for purchase at a point-of-sale system $24_1$-$24_M$, $24_1$-$24_N$, and step 606 the point-of-sale system $24_1$-$24_M$, $24_1$-$24_N$ processes the one or more items in a conventional manner, e.g., by price scanning the one or more items, for purchase by the customer. In such embodiments, steps 604 and 606 may illustratively be concluded before advancing to the payment processing steps 608-620 of the process 600. In other embodiments, one or more of the payment processing steps 608-620 may be executed during the execution of step 604 and/or of step 606, and in such embodiments step 602 may therefore be inserted, in whole or in part, between one or more of the payment processing steps 608-620. In still other embodiments in which pre-payment or acceptance of a pre-payment instrument is required prior to delivery to the customer of one or more requested items, such as may occur, for example, when the requested item is fuel and the point-of-sale system $24_1$-$24_M$, $24_1$-$24_N$ is a conventional fuel dispenser and/or a local/hub server $22_1$-$22_L$ of an associated fuel center and/or convenience store at which one or more such fuel dispensers is located, step 604 may typically be executed prior to the payment processing steps 608-620 and step 606 may then be typically executed, i.e., by activating the fuel dispenser for dispensation of fuel, after the payment processing steps 608-620. In such embodiments, step 602 may thus be fragmented such that step 604 is executed prior to the payment process steps 608-620, i.e., when the customer requests one or more items for purchase at a point-of-sale system of the retail enterprise 11, and such that step 606 may be executed at any of various points within the payment processing steps 608-620 after pre-payment has been accepted or authorized by the main server 12, e.g., after the main server 12 has authorized a pre-payment instrument, such as a credit or debit card, to be subsequently processed for payment following delivery of the requested item(s). Other combinations are also possible, and it will therefore be understood that step 602, in its entirety, may in some embodiments occur at any point relative to one or more of the payment processing steps 608-620, and in other embodiments step 602 may be fragmented such that steps 604 and 606 may each independently occur at any point relative to one or more of the payment processing steps 608-620.

In any case, the payment processing steps of the process 600 begin at step 608 where the processor 50 is operable to control the display monitor of the purchase interface, e.g., a display monitor 218 of a point-of-sale system 24, or a display monitor 320 of a mobile communication device 16 or display monitor 366 of a user computing device 18 in the case that the purchase interface is a web-based purchase interface, to display a number of transaction payment options including an option to select at least one electronic payment system, EPS. The transaction payment options may include, for example, one or more of cash, check, and the like, and the at least one EPS option may include one or more of credit card, debit card, and the like. Thereafter at step 610, the processor 50 is operable to determine whether the customer has selected an EPS or other form of transaction payment. If, at step 610, the processor 50 determines that the customer has selected an EPS option, the process 600 advances to step 612 where the processor 50 is operable to control the display monitor of the purchase interface, e.g., a display monitor 218 of a point-of-sale system 24, or a display monitor 320 of a mobile communication device 16 or display monitor 366 of a user computing device 18 in the case that the purchase interface is a web-based purchase interface, to prompt the customer to supply EPS information to the purchase interface. Thereafter at step 614, the processor 50 is operable to execute a purchase tracking process.

If, at step 610, the customer does not select EPS, the customer has elected to tender payment for the purchase transaction using a method of payment other than via an electronic payment system, EPS, e.g., via check, cash, digital wallet or the like. In such cases, the process 600 advances from step 610 to step 616 where the transaction payment is processed conventionally by the purchase interface and the main server 12, e.g., by accepting a check, cash or a sufficient amount stored in a digital wallet. Thereafter at step 618, the processor 50 is operable to determine whether the customer has, at some point during, or as part of commencement of, the current purchase transaction entered the customer's EMSID at the purchase interface, e.g., one of the point-of-sale systems, $24_1$-$24_M$, $24_1$-$24_N$, or web-based purchase interface. If so, the process 600 advances to step 620 where the processor 50 is operable to update the purchase history associated with the identified EMSID by adding all or part of the information about each of the one or more items to the customer purchase history data 408 associated with the identified EMSID. Following step 614 and step 620, and also following the "NO" branch of step 618, the process 600 terminates.

Purchase Tracking Process

Referring now to FIG. 7, a simplified flow diagram is shown depicting an embodiment of a process 700 for executing the purchase tracking process identified at step 614 of the process 600 illustrated in FIG. 6. In one embodiment, the process 700 is or includes the purchase tracking module 446 stored in the memory 54 (and/or data storage 56) of the main server 12 in the form of instructions executable by the processor 50 of the main server 12, and the process steps of the process 700 will be described below for purposes of this disclosure as being executed by the processor 50 of the main server 12. It will be understood, however, that in some alternate embodiments, the process 700 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 700 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 700 may be stored, in whole or in part, in a memory of the enterprise server(s) 26 in the form of instructions executable, in whole or in part, by a processor of the enterprise server(s) 26. In any such embodiments, the process 700 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

In some embodiments, the process 700 includes step 702, and in such embodiments the processor 50 is operable at step 704 to control the POS display 218 and/or a display of the payment interface 214 to display a message or notification requesting permission to link purchases made during the present purchase transaction to an EMSID linked with the EPI associated with the EPS ("EPSI") supplied by the customer to the POS system in response to the prompt at step 612. Thereafter at step 706, the processor 50 determines whether the customer has entered, e.g., via the payment interface 214 or other customer data entry device, a response to provide or deny permission to link the purchases to an EMSID associated with the EPSI. If, at step 706, the processor 50 determines that the customer has denied permission, the process 700 advances to step 724 where the processor 50 is operable to process payment for the purchase transaction using the ESPI.

In some embodiments of the process 700, step 702 may be omitted, and step 702 is therefore illustrated in FIG. 7 in dashed-line representation. In embodiments of the process 700 which include step 702 and in which the processor 50 determines at step 706 that the customer has granted permission to link the purchases to an EMSID associated with EPSI, the process 700 advances to step 708, and in embodiments of the process 700 which do not include step 702, the process begins at step 708. In any case, the processor 50 is operable at step 708 to search the database, e.g., the customer account data 404, for the customer-supplied EPSI, i.e., the EPI associated with the EPS supplied to the POS system by the customer in response to the prompt therefor at step 612 of the process 600. If, at step 710, the processor 50 does not find EPSI in the customer account data 404 or other database where such information may be stored, the process advances to step 724. If, however, the processor 50 determines at step 710 that EPSI is in the customer account data 404 or other such database, the process 700 advances to step 712 where the processor 50 identifies the EMSID associated in the customer account data 404 or other such database with EPSI.

It may be that the customer, during previous execution of the process 500 illustrated in FIG. 5A, linked more than one EMSID with the EPI associated with the EPS supplied by the customer to the POS system in response to the prompt therefor at step 612 of the process 600. Following step 712, the processor 50 is therefore operable to determine whether more than one EMSID is linked or associated in the customer account data 404 or other such database with EPSI. If so, the process 700 advances to step 716 where the processor 50 is operable to control the POS display 218 and/or a display associated with the payment interface 214 to display a list of all EMSIDs associated in the customer account data 404 or other such database with the EPSI along with instructions prompting the customer to select one of the displayed EMSIDs. Illustratively, the displayed list of EMSIDs is provided in the form of a menu of selectable EMSIDs, although other forms of such a list are contemplated by this disclosure. In any case, the process 700 advances from step 716 to step 718 where processor 50 is operable to determine whether the customer has made an EMSID selection. If not, the process 700 loops back to step 716 until a selection is made. Thereafter the process 700 advances to step 720, which is also executed if, at step 714 the processor 50 determines that only a single EMSID is associated in the customer account data 404 or other such database with EPSI.

At step 720, the processor 50 is operable to update the purchase history associated with the identified or selected EMSID by adding all or part of the information about each of the one or more items to the customer purchase history data 408 associated with the identified EMSID. Thereafter at step 722, the processor 50 is operable to execute a preferences process, and following step 722 the processor 50 is operable to process payment for the transaction as described above. Following step 724, the process 700 terminates and returns to step 614 of the process 600 illustrated in FIG. 6.

Preferences Process

Figure 8:
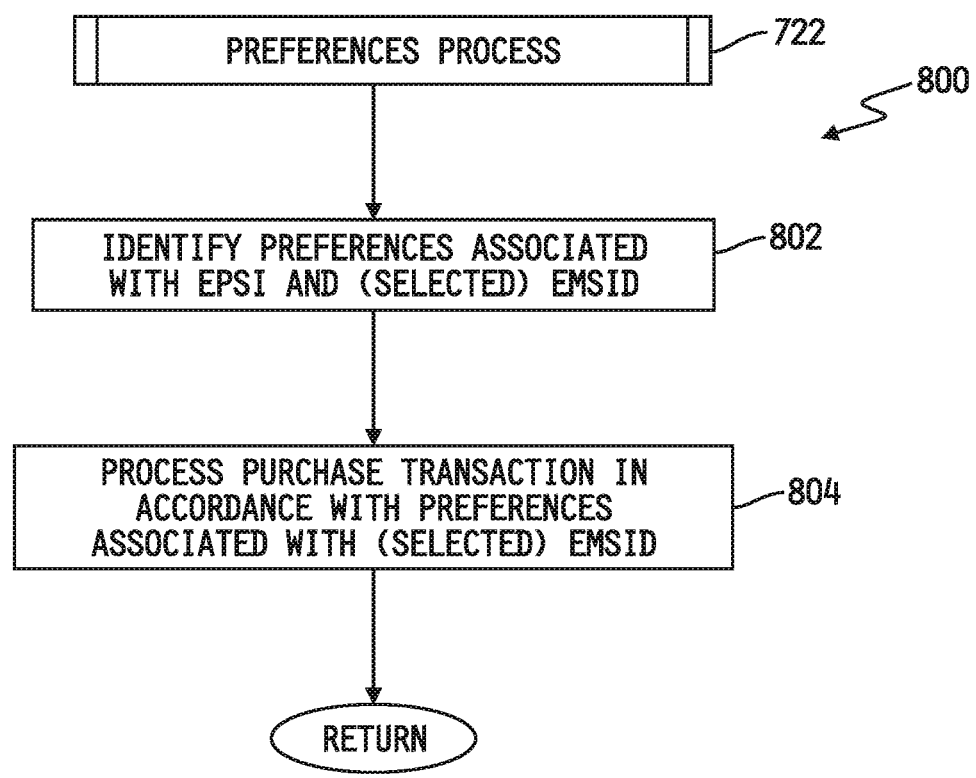
FIG. 8 is a simplified diagram of an embodiment of a preferences process executed as part of the purchase tracking process illustrated in FIG. 7.

Referring now to FIG. 8, a simplified flow diagram is shown depicting an embodiment of a process 800 for executing the preferences process identified at step 722 of the process 700 illustrated in FIG. 7. In one embodiment, the process 700 is or includes the preferences process module 450 stored in the memory 54 (and/or data storage 56) of the main server 12 in the form of instructions executable by the processor 50 of the main server 12, and the process steps of the process 800 will be described below for purposes of this disclosure as being executed by the processor 50 of the main server 12. It will be understood, however, that in some alternate embodiments, the process 800 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 800 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 800 may be stored, in whole or in part, in a memory of the enterprise server(s) 26 in the form of instructions executable, in whole or in part, by a processor of the enterprise server(s) 26. In any such embodiments, the process 800 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The process 800 begins at step 802 where the processor 50 is operable to identify preferences associated with EPSI supplied by the customer in response to the prompt therefor at step 612 of the process 600 and the EMSID identified by the processor 50 and/or selected by the customer in the process 700. Illustratively, the processor 50 is operable execute step 802 by accessing the customer account data 404 or other such database and identifying the one or more preferences linked or associated in the customer account data 404 or other such database with the EMSID and/or EPSI. Thereafter, the processor 50 is operable to process the purchase transaction being conducted at the POS system in accordance with the one or more receipt/display preferences associated with EMSID and EPSI. Thereafter, the process 800 terminates and returns to step 722 of the process 700 of FIG. 7.

It should now be apparent from the foregoing that the system and methods described in this disclosure provide for the identification a customer member of an enterprise membership service, EMS, of any number of electronic payment systems, EPSs, each of which will be automatically linked within the system 10 by the main server 12 to one or more of the customer's enterprise membership service identification codes, EMSID, such that any such EPS subsequently selected and used by the customer as payment for a purchase transaction at a purchase interface of the retail establishment 11 will result in the automatic linking of the items in the purchase transaction, via (a selected) one of the customer's EMSIDs associated with the electronic payment information, EPI, of the selected EPS, to the customer's purchase history data 408 of the database 402. By tendering payment for purchases at the retail enterprise 11 using such an electronic payment system (EPS) that has been previously linked to one or more of the customer's EMSIDs, the customer is relieved of the burden of manually supplying the a customer EMSID to the purchase interface while also ensuring that the customer's purchases are always in such circumstances linked to the customer's purchase history data 408.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. Moreover, it will be understood that while several process steps in various sequences have been illustrated and described herein with respect to the processes 500, 550, 600, 700 and 800 respectively, any one or more such processes 500, 550, 600, 700 and 800 may alternatively include more, fewer and/or different steps, and that any such steps may be executed in different sequences from those illustrated and described, without departing from the scope of the concepts and techniques described herein.

What is claimed is:

1. A method of linking point-of-sale (POS) purchases to customer purchase histories, the method comprising:
    in a database having stored therein a plurality of purchase histories each containing information identifying items previously purchased by one of a plurality of customers of a retail enterprise and a plurality of electronic payment systems each to be used to process payments for purchases made at any of one or more point-of-sale systems of the retail enterprise, associating, with a processor, each of the plurality of electronic payment systems specified by a corresponding one of the plurality of customers to be used to process payments for purchases made by that customer at any of the one or more point-of-sale systems of the retail enterprise with one or more of the plurality of purchase histories assigned to or associated with that customer, and
    in response to tender of an electronic payment system to a purchase interface of the retail enterprise as part of a transaction for the purchase from the retail enterprise of one or more items,
        (i) searching, with the processor, the plurality of electronic payment systems stored in the database for the tendered electronic payment system,
        (ii) determining, with the processor, the one or more of the plurality of purchase histories associated in the database with the one of the plurality of electronic payment systems that matches the tendered electronic payment system,
        (iii) in response to determining that the one or more of the plurality of purchase histories associated in the database with the matching electronic payment system is a single one of the plurality of purchase histories, storing, with the processor, information about the one or more items in the transaction in the single one of the plurality of purchase histories stored in the database, and
        (iv) in response to determining that the one or more of the plurality of purchase histories associated in the database with the matching electronic payment system includes two or more of the plurality of purchase histories,
            (a) prompting, with the processor via the purchase interface, a selection of one of the two or more of the plurality of purchase histories,
            (b) receiving, with the processor, a selection of one of the two or more of the plurality of purchase histories via user interaction with the purchase interface, and
            (c) storing, with the processor, information about the one or more items in the transaction in the selected one of the two or more of the plurality of purchase histories stored in the database.

2. A system for linking point-of-sale (POS) purchases to customer purchase histories, the system comprising:
    a plurality of purchase interfaces of a retail enterprise,
    at least one database having stored therein a plurality of purchase histories each containing information identifying items previously purchased by one of a plurality of customers of the retail enterprise, and a plurality of electronic payment systems each to be used to process payments for purchases made at any of the plurality of purchase interfaces, wherein each of the plurality of electronic payment systems specified by a corresponding one of the plurality of customers to be used to process payments for purchases made by that customer at any of the plurality of purchase interfaces of the retail enterprise is associated with one or more of the plurality of purchase histories assigned to or associated with that customer, a processor configured to control, at least in part, each of the plurality of purchase interfaces, and memory having instructions stored therein which, when executed by the processor, cause the processor to, in response to tender of an electronic payment system to any of the plurality of purchase interfaces as part of a transaction for the purchase from the retail enterprise of one or more items, (i) search the plurality of electronic payment systems stored in the at least one database for the tendered electronic payment system, (ii) determine the one of the plurality of purchase histories associated in the at least one database with the one of the plurality of electronic payment systems that matches the tendered electronic payment system, (iii) in response to determining that the one or more of the plurality of purchase histories associated in the at least one database with the matching electronic payment system is a single one of the plurality of purchase histories, store information about the one or more items in the transaction in the single one of the plurality of purchase histories in the at least one database, and (iv) in response to determining that the one or more of the plurality of purchase histories associated in the at least one database with the matching electronic payment system includes two or more of the plurality of purchase histories, (a) prompt, via a respective one of the plurality of purchase interfaces, a selection of one of the two or more of the plurality of purchase histories, (b) receive a selection of one of the two or more of the plurality of purchase histories via user interaction with the respective one of the plurality of purchase interfaces, and (c) store information about the one or more items in the transaction in the selected one of the two or more of the plurality of purchase histories stored in the at least one database.

3. A non-transitory machine-readable medium comprising a plurality of instructions which, when executed by at least one processor, result in the at least one processor:

storing, in at least one database, a plurality of purchase histories each containing information identifying items previously purchased by one of a plurality of customers of the retail enterprise, and a plurality of electronic payment systems each to be used to process payments for purchases made at any of a plurality of purchase interfaces, associating, in the at least one database, each of the plurality of electronic payment systems specified by a corresponding one of the plurality of customers to be used to process payments for purchases made by that customer at any of the plurality of purchase interfaces of the retail enterprise with one or more of the plurality of purchase histories assigned to or associated with that customer, and in response to tender of an electronic payment system to any of the plurality of purchase interfaces of the retail enterprise as part of a transaction for the purchase from the retail enterprise of one or more items, (i) searching the plurality of electronic payment systems stored in the database for the tendered electronic payment system, (ii) determining the one of the plurality of purchase histories associated in the database with the one of the plurality of electronic payment systems that matches the tendered electronic payment system, (iii) in response to determining that the one or more of the plurality of purchase histories associated in the at least one database with the matching electronic payment system is a single one of the plurality of purchase histories, storing information about the one or more items in the transaction in the single one of the plurality of purchase histories contained in the at least one database, and (iv) in response to determining that the one or more of the plurality of purchase histories associated in the at least one database with the matching electronic payment system includes two or more of the plurality of purchase histories, (a) prompting via a respective one of the plurality of purchase interfaces a selection of one of the two or more of the plurality of purchase histories, (b) receiving a selection of one of the two or more of the plurality of purchase histories via user interaction with the respective one of the plurality of purchase interfaces, and (c) storing information about the one or more items in the transaction in the selected one of the two or more of the plurality of purchase histories stored in the at least one database.

4. The method of claim 1, wherein the database further has stored therein a plurality of enterprise membership identification (EMSID) codes each identifying one of the plurality of customers of the retail enterprise and each identifying a different one of the plurality of purchase histories, the method further comprising associating, with the processor, each of the plurality of electronic payment systems specified by a corresponding one of the plurality of customers to be used to process payments for purchases made by that customer at any of the one or more point-of-sale systems of the retail enterprise with one or more of the plurality of EMSID codes identifying that customer, and wherein determining the one or more of the plurality of purchase histories associated in the database with the one of the plurality of electronic payment systems that matches the tendered electronic payment system comprises:

determining, with the processor, the one or more of the plurality of EMSID codes associated in the database with the matching one of the plurality of electronic payment systems, and determining, with the processor, each of the plurality of purchase histories associated in the database with the determined one or more of the plurality of EMSID codes.

5. The method of claim 1, wherein the purchase interface comprises a display device and an input device, and wherein the method further comprises:

prior to executing steps (i), (ii) and (iii) or (iv), controlling, with the processor, the display device to display a message requesting permission to link purchases made during the transaction to one of the plurality of purchase histories associated in the database with the tendered electronic payment system, executing steps (i), (ii) and (iii) or (iv) upon receipt, via user interaction with the input device, of an instruction to link purchases made during the transaction to one of the plurality of purchase histories associated in the database with the tendered electronic payment system, and bypassing steps (i), (ii), (iii) and (iv) upon receipt, via user interaction with the input device, of an instruction to deny linking of purchases made during the transaction to one of the plurality of purchase histories associated in the database with the tendered electronic payment system.

6. The method of claim 1, wherein the database further has stored therein a plurality of customer preferences each defining one or more preferences to be automatically implemented by the processor during processing of purchase transactions at the purchase interface using the at least one of the plurality of electronic payment systems specified by the corresponding one of the plurality of customers, wherein the one or more preferences include at least one of (a) a manner in which a purchase transaction receipt is to be supplied to the customer, (b) one or more purchase transaction-related items to be displayed or not displayed on a display device of the point-of-sale system during the purchase transactions, and (c) one or more messages to be displayed to a cashier operating the point-of-sale system during the purchase transactions, and wherein the method further comprises:

with the processor, associating in the database each of the plurality of customer preferences with the at least one of the plurality of electronic payment systems specified by the corresponding one of the plurality of customers, with the processor, determining the one or more preferences defined by the one of the plurality of customer preferences associated in the database with the matching one of the plurality of electronic payment systems, and with the processor, automatically implementing the determined one or more customer-selected preferences during the transaction for the purchase from the retail enterprise of the one or more items.

7. The system of claim 2, wherein the at least one database further has stored therein a plurality of enterprise membership identification (EMSID) codes each identifying one of the plurality of customers of the retail enterprise and each identifying a different one of the plurality of purchase histories, wherein the instructions stored in the memory further include instructions, which when executed by the processor, cause the processor to associate each of the plurality of electronic payment systems specified by a corresponding one of the plurality of customers to be used to process payments for purchase made by that customer at any of the one or more point-of-sale systems of the retail enterprise with one or more of the plurality of EMSID codes identifying that customer, and wherein the instructions stored in the memory further include instructions, which when executed by the processor, cause the processor to determine the one or more of the plurality of purchase histories associated in the database with the one of the plurality of electronic payment systems that matches the tendered electronic payment system by determining the one or more of the plurality of EMSID codes associated in the database with the matching one of the plurality of electronic payment systems, and determining each of the plurality of purchase histories associated in the database with the determined one or more of the plurality of EMSID codes.

8. The system of claim 2, wherein each of the plurality of purchase interfaces comprises a display device and an input device, and wherein the instructions stored in the memory further include instructions, which when executed by the processor, cause the processor to:

prior to executing actions (i), (ii) and (iii) or (iv), control the display device of the one of the plurality of purchase interfaces at which the tendered electronic payment system is tendered to display a message requesting permission to link purchases made during the transaction to one of the plurality of purchase histories associated in the database with the tendered electronic payment system, execute actions (i), (ii) and (iii) or (iv) upon receipt, via user interaction with the input device, of an instruction to link purchases made during the transaction to one of the plurality of purchase histories associated in the database with the tendered electronic payment system, and bypass actions (i), (ii), (iii) and (iv) upon receipt, via user interaction with the input device, of an instruction to deny linking of purchases made during the transaction to one of the plurality of purchase histories associated in the database with the tendered electronic payment system.

9. The system of claim 2, wherein the at least one database further has stored therein a plurality of customer preferences each defining one or more preferences to be automatically implemented by the processor during processing of purchase transactions at the purchase interface using the at least one of the plurality of electronic payment systems specified by the corresponding one of the plurality of customers, wherein the one or more preferences include at least one of (a) a manner in which a purchase transaction receipt is to be supplied to the customer, (b) one or more purchase transaction-related items to be displayed or not displayed on a display device of the point-of-sale system during the purchase transactions, and (c) one or more messages to be displayed to a cashier operating the point-of-sale system during the purchase transactions, and wherein the instructions stored in the memory further include instructions which, when executed by the processor, cause the processor to:

associate in the at least one database each of the plurality of customer preferences with the at least one of the plurality of electronic payment systems specified by the corresponding one of the plurality of customers, determine the one or more preferences defined by the one of the plurality of customer preferences associated in the database with the matching one of the plurality of electronic payment systems, and automatically implement the determined one or more customer-selected preferences during the transaction for the purchase from the retail enterprise of the one or more items.

10. The system of claim 2, wherein the plurality of purchase interfaces comprises one or more point-of-sale systems.

11. The system of claim 2, wherein the plurality of purchase interfaces comprises at least one web-based purchase interface.

12. The non-transitory machine-readable medium of claim 3, wherein the at least one database further has stored therein a plurality of enterprise membership identification (EMSID) codes each identifying one of the plurality of customers of the retail enterprise and each identifying a different one of the plurality of purchase histories,
   wherein the plurality of instructions include instructions which, when executed by at least one processor, result in the at least one processor associating each of the plurality of electronic payment systems specified by a corresponding one of the plurality of customers to be used to process payments for purchases made by that customer at any of the one or more point-of-sale systems of the retail enterprise with one or more of the plurality of EMSID codes identifying that customer,
   and wherein the plurality of instructions include instructions which, when executed by at least one processor, result in the at least one processor determining the one or more of the plurality of purchase histories associated in the database with the one of the plurality of electronic payment systems that matches the tendered electronic payment system by determining the one or more of the plurality of EMSID codes associated in the database with the matching one of the plurality of electronic payment systems, and determining each of the plurality of purchase histories associated in the database with the determined one or more of the plurality of EMSID codes.

13. The non-transitory machine-readable medium of claim 3, wherein each of the plurality of purchase interfaces comprises a display device and an input device,
   and wherein the plurality of instructions include instructions which, when executed by at least one processor, result in the at least one processor
      controlling, prior to executing actions (i), (ii) and (iii) or (iv), the display device to display a message requesting permission to link purchases made during the transaction to one of the plurality of purchase histories associated in the database with the tendered electronic payment system,
      executing actions (i), (ii) and (iii) or (iv) upon receipt, via user interaction with the input device, of an instruction to link purchases made during the transaction to one of the plurality of purchase histories associated in the database with the tendered electronic payment system, and
      bypassing actions (i), (ii), (iii) and (iv) upon receipt, via user interaction with the input device, of an instruction to deny linking of purchases made during the transaction to one of the plurality of purchase histories associated in the database with the tendered electronic payment system.

14. The non-transitory machine-readable medium of claim 3, wherein the at least one database further has stored therein a plurality of customer preferences each defining one or more preferences to be automatically implemented during processing of purchase transactions at the purchase interface using the at least one of the plurality of electronic payment systems specified by the corresponding one of the plurality of customers, wherein the one or more preferences include at least one of (a) a manner in which a purchase transaction receipt is to be supplied to the customer, (b) one or more purchase transaction-related items to be displayed or not displayed on a display device of the point-of-sale system during the purchase transactions, and (c) one or more messages to be displayed to a cashier operating the point-of-sale system during the purchase transactions,
   and wherein the plurality of instructions include instructions which, when executed by at least one processor, result in the at least one processor
      associating in the database each of the plurality of customer preferences with the at least one of the plurality of electronic payment systems specified by the corresponding one of the plurality of customers,
      determining the one or more preferences defined by the one of the plurality of customer preferences associated in the at least one database with the matching one of the plurality of electronic payment systems, and
      automatically implementing the determined one or more customer-selected preferences during the transaction for the purchase from the retail enterprise of the one or more items.

* * * * *